United States Patent
Muralidhar et al.

(10) Patent No.: US 9,596,106 B2
(45) Date of Patent: *Mar. 14, 2017

(54) PILOT PATTERN FOR OBSERVATION-SCALAR MIMO-OFDM

(71) Applicants: STMICROELECTRONICS ASIA PACIFIC PTE LTD., Singapore (SG); STMICROELECTRONICS, INC., Coppell, TX (US)

(72) Inventors: Karthik Muralidhar, Singapore (SG); George A. Vlantis, Sunnyvale, CA (US)

(73) Assignees: STMICROELECTRONICS, INC., Coppell, TX (US); STMICROELECTRONICS ASIA PACIFIC PTE LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/170,111

(22) Filed: Jan. 31, 2014

(65) Prior Publication Data

US 2014/0140423 A1 May 22, 2014

Related U.S. Application Data

(63) Continuation-in-part of application No. 13/284,890, filed on Oct. 29, 2011, now Pat. No. 9,240,908, which
(Continued)

(51) Int. Cl.
*H04K 1/10* (2006.01)
*H04L 25/03* (2006.01)
(Continued)

(52) U.S. Cl.
CPC ..... *H04L 25/03821* (2013.01); *H04B 7/0413* (2013.01); *H04L 25/022* (2013.01);
(Continued)

(58) Field of Classification Search
CPC ......... H04L 25/03821; H04L 25/03006; H04L 25/022; H04L 25/0226; H04L 27/2601; H04B 7/0414
(Continued)

(56) References Cited

U.S. PATENT DOCUMENTS 5,479,446 A    12/1995   Mourot
5,852,630 A    12/1998   Langberg et al.
(Continued)

FOREIGN PATENT DOCUMENTS

CN    101026606 A    8/2007

OTHER PUBLICATIONS

Karthik Muralidhar, and D. Sreedhar: "Generalized Vector State-Scalar Observation Kalman Channel Estimator for Doubly-Selective OFDM Systems", IEEE International Conference on Acoustics, Speech and Signal Processing (ICASSP), May 2013, IEEE Conference Publications; pp. 4928-4932.
(Continued)

*Primary Examiner* — Helene Tayong
(74) *Attorney, Agent, or Firm* — Seed IP Law Group LLP

(57) ABSTRACT

In an embodiment, a transmitter includes a transmission path configurable to generate first pilot clusters in response to a matrix, each first pilot cluster including a respective first pilot subsymbol in a first cluster position and a respective second pilot subsymbol in a second cluster position such that a vector formed by the first pilot subsymbols is orthogonal to a vector formed by the second pilot subsymbols, the matrix having a dimension related to a number of cluster positions in each of the first pilot clusters. For example, where such a transmitter transmits simultaneous orthogonal-frequency-division-multiplexed (OFDM) signals (e.g., MIMO-OFDM signals) over respective channels that may impart inter-carrier interference (ICI) to the signals due to
(Continued)

Doppler spread, the pattern of the pilot symbols that compose the pilot clusters may allow a receiver of these signals to estimate the responses of these channels more accurately than conventional receivers.

16 Claims, 10 Drawing Sheets

Related U.S. Application Data is a continuation-in-part of application No. 12/963,569, filed on Dec. 8, 2010, now Pat. No. 9,020,050, and a continuation-in-part of application No. 12/579,935, filed on Oct. 15, 2009, now Pat. No. 8,737,536, and a continuation-in-part of application No. 12/579,969, filed on Oct. 15, 2009, now Pat. No. 8,718,208, application No. 14/170,111, which is a continuation-in-part of application No. 13/284,898, filed on Oct. 29, 2011, now Pat. No. 9,137,054, which is a continuation-in-part of application No. 12/963,569, and a continuation-in-part of application No. 12/579,935, and a continuation-in-part of application No. 12/579,969.

(60) Provisional application No. 61/267,667, filed on Dec. 8, 2009, provisional application No. 61/360,367, filed on Jun. 30, 2010, provisional application No. 61/105,704, filed on Oct. 15, 2008, provisional application No. 61/158,290, filed on Mar. 6, 2009, provisional application No. 61/495,218, filed on Jun. 9, 2011.

(51) Int. Cl.
  *H04B 7/04* (2006.01)
  *H04L 27/26* (2006.01)
  *H04L 25/02* (2006.01)
  *H04L 5/00* (2006.01)

(52) U.S. Cl.
  CPC ...... *H04L 25/0226* (2013.01); *H04L 27/2601* (2013.01); *H04L 5/0048* (2013.01); *H04L 25/0204* (2013.01)

(58) Field of Classification Search
  USPC .................................................. 375/260, 296
  See application file for complete search history.

(56) References Cited

U.S. PATENT DOCUMENTS

| | | | |
|---|---|---|---|
| 6,680,901 B1 | 1/2004 | Yamamoto et al. | |
| 7,965,785 B2* | 6/2011 | Li | H04B 7/026 375/267 |
| 8,098,713 B2 | 1/2012 | Baxley et al. | |
| 8,170,516 B2 | 5/2012 | Dehos et al. | |
| 8,428,158 B2 | 4/2013 | Maltsev et al. | |
| 8,929,353 B2 | 1/2015 | Wang | |
| 2002/0146063 A1 | 10/2002 | Gorokhov et al. | |
| 2002/0181407 A1 | 12/2002 | Khullar et al. | |
| 2004/0223480 A1* | 11/2004 | Nguyen et al. | 370/342 |
| 2004/0257979 A1 | 12/2004 | Ro et al. | |
| 2005/0147024 A1 | 7/2005 | Jung et al. | |
| 2005/0201268 A1 | 9/2005 | Aoki et al. | |
| 2006/0013326 A1 | 1/2006 | Yoshida | |
| 2006/0018394 A1 | 1/2006 | van Zelst et al. | |
| 2006/0056540 A1 | 3/2006 | Magee | |
| 2006/0072692 A1 | 4/2006 | Gifford et al. | |
| 2006/0133457 A1 | 6/2006 | Wang et al. | |
| 2006/0209973 A1 | 9/2006 | Gorokhov et al. | |
| 2006/0209979 A1 | 9/2006 | Sandell et al. | |
| 2006/0291372 A1 | 12/2006 | Koo et al. | |
| 2007/0133386 A1 | 6/2007 | Kim et al. | |
| 2007/0133696 A1 | 6/2007 | Iancu et al. | |
| 2007/0133699 A1 | 6/2007 | Roh et al. | |
| 2007/0248151 A1 | 10/2007 | Kim et al. | |
| 2007/0253321 A1 | 11/2007 | Akita et al. | |
| 2007/0297522 A1 | 12/2007 | Baggen et al. | |
| 2008/0144486 A1 | 6/2008 | Wilhelmsson et al. | |
| 2008/0212462 A1 | 9/2008 | Ahn et al. | |
| 2008/0219343 A1 | 9/2008 | Wu et al. | |
| 2008/0225934 A1 | 9/2008 | Mourad et al. | |
| 2009/0052566 A1 | 2/2009 | Maltsev et al. | |
| 2009/0103568 A1 | 4/2009 | Garba et al. | |
| 2009/0154625 A1 | 6/2009 | Kwak et al. | |
| 2009/0239494 A1 | 9/2009 | Park et al. | |
| 2009/0279623 A1 | 11/2009 | Wu et al. | |
| 2010/0027698 A1 | 2/2010 | Kim et al. | |
| 2010/0098198 A1 | 4/2010 | Muralidhar et al. | |
| 2010/0103877 A1 | 4/2010 | Wang et al. | |
| 2010/0166118 A1 | 7/2010 | Mantravadi et al. | |
| 2011/0129024 A1 | 6/2011 | Karthik | |
| 2011/0149929 A1 | 6/2011 | Kleider et al. | |
| 2011/0176626 A1 | 7/2011 | Liao et al. | |
| 2011/0211630 A1 | 9/2011 | Nakahara et al. | |
| 2012/0045008 A1 | 2/2012 | Karthik et al. | |
| 2012/0114053 A1 | 5/2012 | Karthik et al. | |
| 2012/0114069 A1 | 5/2012 | Karthik et al. | |
| 2012/0155425 A1 | 6/2012 | Budianu et al. | |
| 2013/0235946 A1 | 9/2013 | Budianu et al. | |
| 2013/0279627 A1 | 10/2013 | Wu et al. | |

OTHER PUBLICATIONS

Karthik Muralidhar and Kwok Hung Li, "A Low-Complexity Kalman Approach for Channel Estimation in Doubly-Selective OFDM Systems", IEEE Signal Processing Letters, vol. 16, No. 7, Jul. 2009, pp. 632-635.

Karthik Muralidhar, Evelyn Kurniawati, Samsudin Ng, "Further Results on the VSSO Kalman Channel Estimator for Doubly-Selective OFDM Systems", pp. 4.

Osvaldo Simeone, Yeheskel Bar-Ness, and Umberto Spagnolini, "Pilot-Based Channel Estimation for OFDM Systems by Tracking the Delay-Subspace", IEEE Transactions on Wireless Communications, vol. 3, No. 1, January 2004, pp. 315-325.

Zijian Tang, Rocco Claudio Cannizzaro, Geert Leus, and Paolo Banelli, "Pilot-Assisted Time-Varying Channel Estimation for OFDM Systems", IEEE Transactions on Signal Processing, vol. 55, No. 5, May 2007, pp. 2226-2238.

M. R Raghavendra, S. Bhashyann, and K. Giridhar, "Exploiting Hopping Pilots for Parametric Channel Estimation in OFDM Systems", IEEE Signal Processing Letters, Vol. 12, No. 11, Nov. 2005, pp. 737-740.

Baoguo Yang, Khaled Ben Letaief, Roger S. Cheng, and Zhigang Cao, "Channel Estimation for OFDM Transmission in Multipath Fading Channels Based on Parametric Channel Modeling", IEEE Transactions on Communications, Vol. 49, No. 3, Mar. 2001, pp. 467-479.

Karkarthik Muralidhar, Li Kwok Hung and Ying Chang Liang, "Low-Complexity Equalisation Methods for OFDM Systems in doubly Selective Channels", Vehicular Technology Conference, 2008. VCT Spring 2008. IEEE, May 11-14, 2008, Singapore, pp. 683-687.

S. M. Kay, "Fundamentals of Statistical signal processing: Estimation Theory," vol. 1, Prentice Hall: New Jersey, 1993, pp. 6.

Proakis, "Digital Communications," McGraw Hill, 1995, pp. 4.

Xiaodong Cai and Georgios B. Giannakis, "Bounding Performance and Suppressing Intercarrier Interference in Wireless Mobile OFDM", IEEE Transactions on Communications, vol. 51, No. 12, Dec. 2003, pp. 2047-2056.

Paolo Banelli, Rocco Claudio Cannizzaro, and Luca Rugini, "Data-Aided Kalman Tracking for Channel Estimation in Doppler-Affected OFDM Systems", ICASSP 2007, IEEE 2007, pp. 133-136.

(56) References Cited

OTHER PUBLICATIONS

Hongmei Wang, Xiang Chen, Shidong Zhou, Ming Zhao, and Yan Yao, "Letter—Low-Complexity ICI Cancellation in Frequency Domain for OFDM Systems in Time-Varying Multipath Channels", IEICE Trans. Commun., vol. E89-B, No. 3, Mar. 2006, pp. 1020-1023.

U.S. Appl. No. 12/579,935, entitled: "Recovery of Data From a Multi Carrier Signal", filed Oct. 15, 2009, pp. 52.

U.S. Appl. No. 12/579,969, entitled: "Recovery of Data From a Multi Carrier Signal", filed Oct. 15, 2009, pp. 55.

DVB Mobile TV—DVB-H—DVB-SH—DVB-IPDC, http://www.dvb-h.org/ p. 1.

IEEE 802.11—Wikipedia, the free encyclopedia, http://en.wikipedia.org/wiki/IEEE_802.11, pp. 13.

IEEE 802.16—Wikipedia, the free encyclopedia, http://en.wikipedia.orglwiki/IEEE_802.16, p. 1.

3GPP Long Term Evolution—Wikipedia, the free encyclopedia, http://en.wikipedia.org/wiki/3GPP_Long_Term_Evolution, p. 1.

IEEE 802.22 WRAN WG Home Page, IEEE 802.22 Working Group on Wireless Regional Area Networks Enabling Rural Broadband Wireless Access Using Cognitive Radio Technology in TV Whitespaces, http://www.ieee802.org122/, pp. 2.

Rocco Claudio Cannizzaro, Paolo Banelli, and Geert Leus, "Adaptive Channel Estimation for OFDM Systems with Doppler spread", IEEE Signal Processing Advances in Wireless Communications, Jul. 2006, pp. 5.

Steven M. Kay, "Fundamentals of Statistical Signal Processing—Estimation Theory", Prentice Hall Signal Processing Series, 1993, vol. 1, Chapter 8, pp. 219-288.

Steven M. Kay, "Fundamentals of Statistical Signal Processing—Estimation Theory", Prentice Hall Signal Processing Series, 1993, vol. 1, Chapter 12, pp. 379-418.

I. Barhumi, G. Leus, and M. Moonen, "Optimal training design for MIMO OFDM systems in mobile wireless channels," IEEE Transactions Signal Processing, vol. 51, No. 6, pp. 1615-1624, Jun. 2003.

3GPP TS 36.211, "3rd generation partnership project: Physical channels and modulation," 3GPP 2009.

ETSI EN 300 744, "DVB: Framing structure, channel coding and modulation for digital terrestrial television" ETSI 2004.

A. Stamoulis, S. N. Diggavi, and Al-Dhahir, "Intercarrier interference in MIMO OFDM," IEEE Trans. Communications, vol. 50, No. 10, pp. 2451-2464, Oct. 2002.

G. B. Giannakis and C. Tepedelenlioglu, "Basis expansion models and diversity techniques for blind identification and equalization of time-varying channels," Proc. IEEE, vol. 86, No. 10, pp. 1969-1986, Oct. 1998.

W. G. Song and J. T. Lim, "Channel estimation and signal detection for MIMO-OFDM with time varying channels," IEEE Communications Letters, vol. 10, No. 7, Jul. 2006.

F. F. Cao and J. Li, "Comments on channel estimation and signal detection for MIMO-OFDM with time varying channels," IEEE Communications Letters, vol. 13, No. 9, Sep. 2009.

T. L. Tung, K. Yao, and R. E. Hudson, "Channel estimation and adaptive power allocation for performance and capacity improvement of multiple-antenna OFDM systems," IEEE Signal Processing Advances in Wireless Communications, Mar. 2001.

T. Wang, J. G. Proakis, E. Marsy, and J. R. Zeidler, "Performance degradation of OFDM systems due to Doppler spreading," IEEE Transactions Wireless Communications, vol. 5, No. 6, pp. 1422-1432, Jun. 2006.

W. S. Hou and B. S. Chen, "ICI cancellation for OFDM communication systems in time-varying multipath fading channels," IEEE Transactions Wireless Communications, vol. 4, No. 5, pp. 2055-2066, Sep. 2005.

L. Rugini, P. Banelli, and G. Leus, "Simple equalization of time-varying channels for OFDM," IEEE Communications Letters, vol. 9, No. 7, pp. 619-621, Jul. 2005.

W. G. Jeon, K. H. Chang, and Y. S. Cho, "An equalization technique for orthogonal frequency-division multiplexing systems in time-variant multipath channels," IEEE Transactions Communications, vol. 47, No. 1, pp. 27-32, Jan. 1999.

P. S. Rossi and R. R. Muller, "Slepian-based two-dimensional estimation of time-frequency variant MIMO-OFDM channels," IEEE Signal Processing Letters, vol. 15, pp. 21-24, May 2007.

T. Zemen and C. F. Mecklenbrauker, "Time-variant channel estimation using discrete prolate spheroidal sequences," IEEE Trans. Signal Processing, vol. 53, No. 9, pp. 3597-3607, Sep. 2005.

X. Dai, "Optimal training design for linearly time-varying MIMO/OFDM channels modeled by a complex exponential basis expansion," IET Trans. Communications, vol. 1, No. 5, pp. 945-953, Oct. 2007.

Karthik Muralidhar, and Kwok H. Li, "On the Full Column-Rank Condition of the Channel Estimation Matrix in Doubly-Selective MIMO-OFDM Systems," http://arxiv.org/abs/1010.1391.

P. Schniter, "Low-complexity equalization of OFDM in doubly selective channels," IEEE Transactions Signal Processing, vol. 52, No. 4, pp. 1002-1011, Apr. 2004.

A. M. Robert, Linear Algebra: Examples and Applications. World Scientific, 2005.

Z. Tang and G. Leus, "Pilot schemes for time-varying channel estimation in OFDM systems," IEEE Signal Processing Advances in Wireless Communications, pp. 1-5, Jun. 2007.

K. Muralidhar, "Equivalence of VSSO and VSVO Kalman Channel Estimators in Doubly-Selective OFDM SystemsA Theoretical Perspective," IEEE Trans. Sig. Proc., vol. 18, No. 4, pp. 223-226, Apr. 2011.

H. Hijazi, E. P. Simon, M. Lienard, and L. Ros, "Channel estimation for MIMO-OFDM systems in Fast Time-Varying Environments," IEEE 4th International Symposium on Communications, Control and Signal Processing (ISCCSP)., pp. 1-6, Mar. 2010.

K. Muralidhar, "On the full column rank condition of the channel estimation matrix and pilot pattern designs in doublyselective MIMO-OFDM systems," in preparation.

Tom Minka, "Lightspeed Matlab Toolbox," http://research.microsoft.com/en-us/um/people/minka/software/lightspeed/.

Karthik Muralidhar and D. Sreedhar, "Pilot Design for Vector State-Scalar Observation Kalman Channel Estimators in Doubly-Selective MIMO-OFDM Systems", IEEE Wireless Communications Letters, vol. 2, No. 2, Apr. 2013, 4 pages.

\* cited by examiner

PILOT PATTERN FOR OBSERVATION-SCALAR MIMO-OFDM

PRIORITY CLAIM

The present application claims the benefit of priority to the following applications, and is a Continuation-in-Part of copending U.S. patent application Ser. No. 13/284,890, filed Oct. 29, 2011, which application is a Continuation-in-Part of copending U.S. patent application Ser. No. 12/963,569, filed Dec. 8, 2010, which application claims the benefit of U.S. Provisional Patent Application Nos. 61/267,667, filed Dec. 8, 2009, and 61/360,367, filed Jun. 30, 2010; application Ser. No. 12/963,569 is also a Continuation-in-Part of copending U.S. patent application Ser. No. 12/579,935, filed Oct. 15, 2009, and Ser. No. 12/579,969, filed Oct. 15, 2009, which applications claim the benefit of U.S. Provisional Patent Application Ser. Nos. 61/105,704, filed Oct. 15, 2008, and 61/158,290, filed Mar. 6, 2009; application Ser. No. 13/284,890 also claims the benefit of U.S. Provisional Patent Application Ser. No. 61/495,218, filed Jun. 9, 2011; and the present application is also a Continuation-in-Part of copending U.S. patent application Ser. No. 13/284,898, filed Oct. 29, 2011, which application is a Continuation-in-Part of copending U.S. patent application Ser. No. 12/963,569, filed Dec. 8, 2010, which application claims the benefit of U.S. Provisional Patent Application Nos. 61/267,667, filed Dec. 8, 2009, and 61/360,367, filed Jun. 30, 2010; application Ser. No. 12/963,569 is also a Continuation-in-Part of copending U.S. patent application Ser. No. 12/579,935, filed Oct. 15, 2009, and Ser. No. 12/579,969, filed Oct. 15, 2009, which applications claim the benefit of U.S. Provisional Patent Application Ser. Nos. 61/105,704, filed Oct. 15, 2008, and 61/158,290, filed Mar. 6, 2009; application Ser. No. 13/284,890 also claims the benefit of U.S. Provisional Patent Application Ser. No. 61/495,218, filed Jun. 9, 2011; all of the foregoing applications are incorporated herein by reference in their entireties.

SUMMARY

In an embodiment, a transmitter includes a transmission path configurable to generate first pilot clusters in response to a matrix, each first pilot cluster including a respective first pilot subsymbol in a first cluster position and a respective second pilot subsymbol in a second cluster position such that a vector formed by the first pilot subsymbols is orthogonal to a vector formed by the second pilot subsymbols, the matrix having a dimension related to a number of cluster positions in each of the first pilot clusters.

For example, where such a transmitter transmits simultaneous orthogonal-frequency-division-multiplexed (OFDM) signals (e.g., MIMO-OFDM signals) over respective channels that may impart inter-carrier interference (ICI) to the signals due to Doppler spread, the pattern of the pilot symbols that compose the pilot clusters may allow a receiver of these signals to estimate the responses of these channels more accurately than conventional receivers.

In another embodiment, a transmitter includes first and second transmission paths. The first transmission path is configurable to generate in response to a first matrix first pilot clusters each including a respective first pilot subsymbol in a first cluster position, the first matrix having a dimension. And the second transmission path is configurable to generate in response to a second matrix second pilot clusters each including a respective second pilot subsymbol in a second cluster position such that a vector formed by the first pilot subsymbols is orthogonal to a vector formed by the second pilot subsymbols, the dimension of the second matrix having a different size than the dimension of the first matrix.

For example, where such a transmitter transmits simultaneous orthogonal-frequency-division-multiplexed (OFDM) signals (e.g., MIMO-OFDM signals) over respective channels that may impart inter-carrier interference (ICI) to the signals due to Doppler spread, the pattern of the pilot symbols that compose the pilot clusters may allow a receiver of these signals to use a recursive algorithm, such as a Vector State Scalar Observation (VSSO) Kalman algorithm, to estimate the responses of these channels. Such a receiver may estimate the channel responses more accurately, more efficiently, with a less-complex algorithm (e.g., with an algorithm that does not require a real-time matrix inversion), and with less-complex software or circuitry, than conventional receivers.

DETAILED DESCRIPTION

Figure 1:
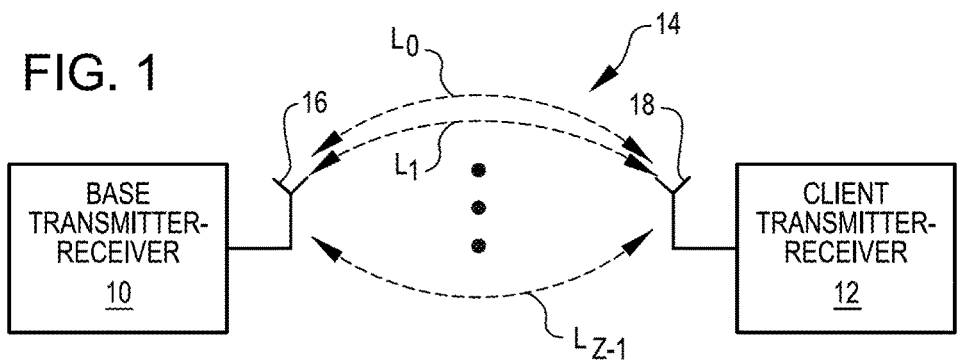
FIG. 1 is a block diagram of an embodiment of base and client orthogonal-frequency-division-multiplexing (OFDM) transmitter-receivers that are not moving significantly relative to one another while they are communicating with one another.

FIG. 1 is a block diagram of an embodiment of a base transmitter-receiver 10 and of a client transmitter-receiver 12, which communicates with the base transmitter-receiver over a wireless channel 14 via multicarrier signals (e.g., OFDM signals) while remaining substantially stationary relative to the base transmitter-receiver. For example, the base 10 may be a wireless router in a home or office, and the client 12 may be a computer that communicates with the base via OFDM signals that have N carriers. One or more antennas 16 are coupled to the base 10, and one or more antennas 18 are coupled to the client 12. Each antenna 16 may function as only a transmit antenna, as only a receive antenna, or as a transmit-receive antenna; and each antenna 18 may function similarly. Furthermore, the channel 14 may include Z multiple paths $L_0$-$L_{z-1}$ over which the multicarrier signals propagate. For example, a first path $L_0$ may be a straight-line path between the antennas 16 and 18, and a second path $L_1$ may be a multi-segmented path that is caused by signal reflections from one or more objects (not shown in FIG. 1) near the base 10, client 12, or channel 14.

Figure 2:
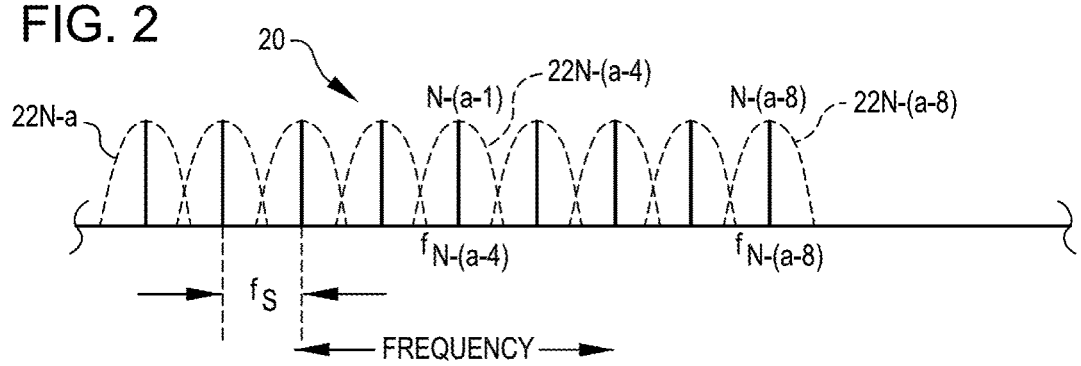
FIG. 2 is a plot of an embodiment of the frequencies of the carrier signals (solid lines) generated by the presently transmitting transmitter-receiver of FIG. 1, and of the frequency "slots" (dashed lines) that these carrier signals may respectively occupy at the presently receiving transmitter-receiver of FIG. 1.

FIG. 2 is a frequency plot of some of the N carriers (here, carriers N-a to N-(a−8) are shown in solid line and are hereinafter called "subcarriers") of an embodiment of an OFDM data symbol 20, which may be transmitted by the base 10 of FIG. 1 and received by the client 12, or vice versa—an OFDM data symbol is a portion of an OFDM signal that is modulated with the same data subsymbols for a symbol period. Each of the subcarriers N-a to N-(a−8) has a respective frequency $f_{N-a}$-$f_{N-(a-8)}$, and is orthogonal to the other subcarriers. In this context, "orthogonal" means that, in the absence of inter-carrier interference (discussed below) and noise, one may construct a time-domain signal from these modulated subcarriers (e.g., using an Inverse Fast Fourier Transform (IFFT)), and then extract these modulated subcarriers, and the information that they carry, from the time-domain signal (e.g., using a Fast Fourier Transform (FFT)) with no loss of information. Furthermore, although the base 10 is described as transmitting the OFDM signal in the example below, it is understood that this example would be similar if the client 12 were transmitting the OFDM signal.

Referring to FIGS. 1 and 2, the transmitter of the base 10 modulates each of at least some of the N subcarriers with a respective data value (hereinafter a data subsymbol) for a time period hereinafter called a symbol period—the transmitter may not use one or more of the N subcarriers due to, for example, excessive interference at the frequencies of these subcarriers. Examples of suitable modulation schemes include binary phase-shift keying (BPSK), quadrature phase-shift keying (QPSK), and quadrature amplitude modulation (QAM), the latter two schemes providing data subsymbols that each have multiple bits.

The frequency spacing $f_s$ between adjacent ones of the N subcarriers is typically constant, and is conventionally selected to minimize inter-carrier interference (ICI), which is a phenomenon that occurs if energy from one subcarrier "spills over" to the frequency slot of another subcarrier at the receiver of the client 12. At the transmitter of the base 10, each of the active ones of the N subcarriers has a frequency $f_k$ (for k=0 to N−1) represented by a respective one of the solid lines (only the frequencies $f_k$ for k=N-a to N-(a−8) are shown in FIG. 2). But at the receiver of the client 12, the respective frequency $f_k$ of each subcarrier may be effectively shifted within a respective frequency slot 22 indicated by the dashed lines (only the slots 22 of the frequencies $f_k$ for k=N-a to N-(a−8) are shown in FIG. 2). For example, at the receiver of the client 12, the frequency $f_{N-a}$ of the subcarrier N-a may be shifted to another location within the frequency slot $22_{N-a}$, or may be "spread" over multiple locations within this frequency slot. Causes for this frequency shifting/spreading may include, for example, the existence of multiple transmission paths L (i.e., Z>1), and channel conditions (e.g., humidity, temperature) that may effectively shift the respective phase and attenuate the respective amplitude of each modulated subcarrier.

To allow the receiver of the client 12 to recover the data subsymbols in the presence of ICI and other interference or noise, the transmitter of the base 10 transmits an OFDM training symbol—a "training symbol" is the combination of all the training subsymbols transmitted during a training-symbol period—shortly before transmitting an OFDM data symbol—a "data symbol" is the combination of all of the data subsymbols transmitted during an OFDM data-symbol period. That is, the transmitter of the base 10 transmits the training symbol during a first OFDM symbol period, and transmits the data symbol during a second, subsequent OFDM symbol period. Because the receiver of the client 12 "knows" the identity of the transmitted training symbol ahead of time, the receiver characterizes the channel 14 by comparing the received training symbol with the known transmitted training symbol. For example, the receiver may characterize the channel 14 by generating an N×N matrix $\hat{H}$ of estimated complex frequency-domain coefficients that respectively represent the estimated frequency response (e.g., the imparted ICI, amplitude attenuation, and phase shift) of the channel at each of the subcarrier frequencies $f_k$—the "^" indicates that $\hat{H}$ is an estimate of the actual channel matrix H. As discussed in more detail below, the receiver may then use this channel-estimation matrix H to recover transmitted data symbols from respective received data symbols.

Figure 3:
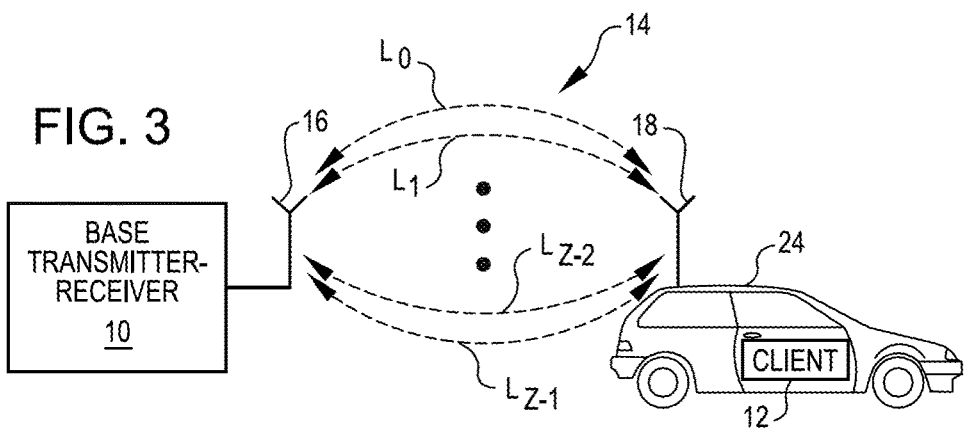
FIG. 3 is a block diagram of an embodiment of base and client OFDM transmitter-receivers that are moving relative to one another while they are communicating with one another.

FIG. 3 is a block diagram of an embodiment of the base transmitter-receiver 10 and of the client transmitter-receiver 12 of FIG. 1, but where the base and client are moving relative to one another at a non-zero velocity (the velocity may be constant or time varying) while they are communicating with one another, and where like numbers refer to components common to FIGS. 1 and 3. For example, the base 10 may be a cell tower, and the client 12 may be an internet-capable phone that is located within a moving automobile 24. The base 10 and the client 12 may communicate with one another according to one or more communications standards that specify OFDM technology for mobile communications. These standards include, for example, the DVB-H standard and the WiMAX standard.

Furthermore, although only the client 12 is shown as moving, in other embodiments the base 10 may be moving and the client 12 may be stationary, or both the base and the client may be moving simultaneously.

Figure 4:
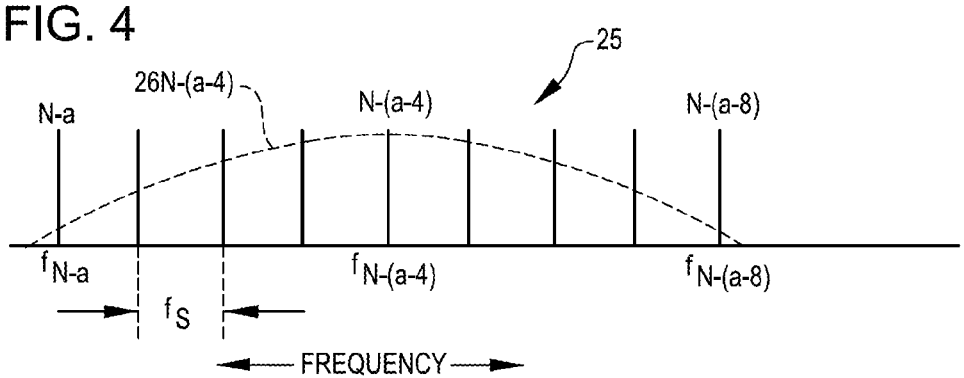
FIG. 4 is a plot of an embodiment of the frequencies of carrier signals (solid lines) generated by the presently transmitting transmitter-receiver of FIG. 3, and of the frequency slot (dashed line) that the center one of these plotted carrier signals may occupy at the presently receiving transmitter-receiver of FIG. 3.

FIG. 4 is a frequency plot of some of the N subcarriers (here, subcarriers N-a to N-(a−8) in solid line) of an embodiment of an OFDM symbol 25 that may be transmitted by the base 10 of FIG. 1 and received by the client 12, or vice versa. Although the base 10 is described as transmitting the OFDM symbol in the example below, it is understood that this example would be similar if the client 12 were transmitting the OFDM symbol.

At the base 10, the OFDM symbol may be similar to the OFDM symbol of FIG. 2 in that the base modulates each of at least some of the N subcarriers with a respective data subsymbol, and each of the data-modulated ones of the N subcarriers has a center frequency $f_k$ represented by a respective one of the solid lines.

But at the receiving client 12, the frequency $f_k$ of a subcarrier k may be shifted/spread by one or more times G as indicated by the frequency slot $26_{N-(a-4)}$ of the subcarrier k=N-(a−4) (only this one frequency slot is shown in FIG. 3 for clarity) such that energy from a subcarrier k may spill over to the frequencies of one or more adjacent subcarriers (e.g., k−1, k+1) on either side of the subcarrier k. For example, in the embodiment shown in FIG. 4, energy from the subcarrier k=N-(a−4) may spill over to the frequencies $f_{N-a}$-$f_{N-(a-3)}$ and $f_{N-(a-5)}$-$f_{N-(a-8)}$ of the subcarriers k=N-a to N-(a−3) and k=N-(a−5) to N-(a−8).

The frequency shifts/spreads of the received OFDM subcarriers of FIG. 4 may be significantly greater than the frequency shifts/spreads of the received OFDM subcarriers of FIG. 2 because, in addition to the causes for this frequency shifting/spreading described above (e.g., the existence of multiple transmission paths L and channel conditions), the received OFDM subcarriers of FIG. 4 may also experience respective Doppler shifts caused by the relative movement between the base 10 and the client 12.

According to the Doppler Effect, the frequency of a signal at a receiver is different from the frequency of the signal at a transmitter if the receiver and transmitter are moving relative to one another at a non-zero velocity. If the receiver and transmitter are moving away from one another, then the frequency of the signal at the receiver is typically lower than the frequency of the signal at the transmitter; conversely, if the receiver and transmitter are moving toward one another, then the frequency of the signal at the receiver is typically higher than the frequency of the signal at the transmitter. For example, a person (receiver) who is listening to the whistle of an approaching train (transmitter) may experience this phenomenon. While the train is moving toward the person, the person perceives the whistle as having a pitch (frequency) that is higher than the pitch that one on the train would perceive the whistle as having. But after the train passes the person, and is thus moving away from him, the person perceives the whistle as having a pitch lower than the pitch that one on the train would perceive the whistle as having.

Consequently, the subcarrier frequencies of the OFDM symbol 25 of FIG. 4 may be influenced by the Doppler Effect in a similar manner at the receiver of the client 12 of FIG. 3.

A measure of the influence that the Doppler Effect has on a single transmitted tone (e.g., an unmodulated subcarrier signal with constant, non-zero amplitude) is the "Doppler Spread", which is the bandwidth that the tone may occupy at the receiver due to the Doppler Effect. For example, suppose that the frequency of the tone is 1,000 Hz at the transmitter, but that at the receiver, due to the non-zero velocity of the receiver relative to the transmitter, the received tone may have a frequency anywhere from 980 Hz to 1,020 Hz depending on the instantaneous velocity. Therefore, in this example, the Doppler Spread=1020 Hz−980 Hz=40 Hz. That is, the Doppler Spread is (40 Hz)/(1000 Hz)=4% of the frequency of the transmitted tone—although expressed here in Hz and as a percentage of the transmitted frequency, the Doppler Spread may be expressed in other quantities as described below.

For mobile OFDM devices, one may characterize the ICI caused by the Doppler Spread of a subcarrier in terms of the highest number of adjacent subcarriers with which the subcarrier may interfere. For example, the total Doppler induced ICI caused by the $50^{th}$ (k=50) subcarrier is greater if energy from this subcarrier spills over to the $48^{th}$, $49^{th}$, $51^{st}$, and $52^{nd}$ subcarriers, and is less if energy from this subcarrier spills over to only the $49^{th}$ and $51^{st}$ subcarriers. In actuality, because the Doppler Spread of a subcarrier may cause the subcarrier to spill over energy into many or all of the other N subcarrier slots to some degree, one may set a Doppler Spread interference threshold below which one subcarrier is deemed to be unaffected by the Doppler Spread of another subcarrier; such threshold may have units of, e.g., power or amplitude. Therefore, for a mobile OFDM device, the extent of Doppler induced ICI caused by a subcarrier k may be defined in terms of the number of adjacent subcarriers (above and below the subcarrier k in question) that may experience a level of ICI above the Doppler Spread interference threshold for the device. Furthermore, although in some applications one may assume that all of the subcarriers k experience the same Doppler Spread, in other applications, one may decide not to make this assumption.

Consequently, referring to FIGS. 3 and 4, the frequency slots 26 (only the frequency slot $26_{N-(a-4)}$ of the subcarrier N-(a−4) is shown for clarity) each represent the bandwidth that a respective subcarrier transmitted by the base 10 may occupy at the receiving client 12 due to all causes (e.g., the existence of multiple transmission paths L, channel conditions, and Doppler Spread). But when the base 10 and client 12 are moving relative to one another, the greatest contributor to the frequency-slot bandwidth may be the Doppler Spread.

Still referring to FIGS. 3 and 4, because the Doppler Spread of an OFDM signal may vary relatively quickly with time, transmitting a training symbol separately from the data symbol may not allow the receiver of the client 12 to adequately determine the channel-estimation matrix $\hat{H}$ for the channel 14 as it exists while the OFDM data symbol is being transmitted.

Consequently, mobile OFDM devices, such as the base 10, may combine training subsymbols and data subsymbols into a single OFDM symbol such that a receiving device, such as the client 12, may characterize the channel 14 for the same time period during which the data subsymbols are transmitted.

Figure 5:
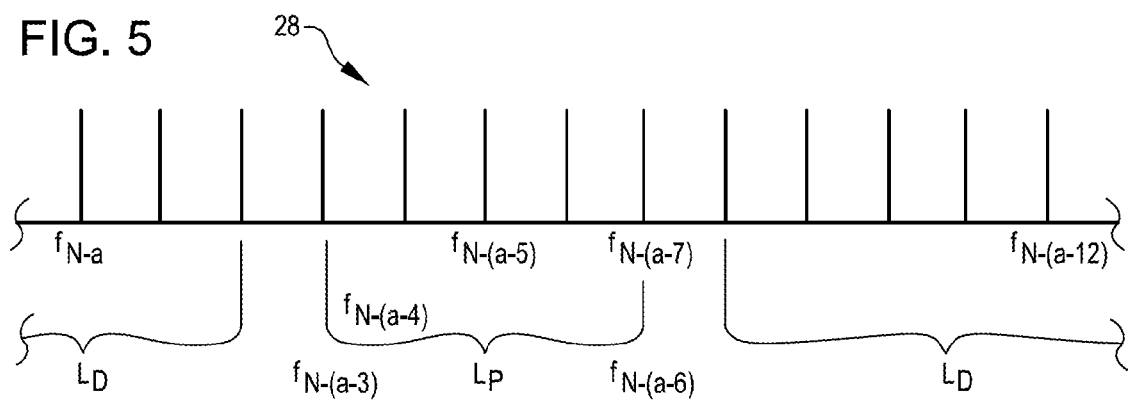
FIG. 5 is a plot of an embodiment of the frequencies of carrier signals generated by the presently transmitting transmitter-receiver of FIG. 3, where the carrier signals are grouped into clusters of data carrier signals (data clusters) and clusters of pilot carrier signals (pilot clusters).

FIG. 5 is a frequency plot of some of the N subcarriers k (here, subcarriers k=N-a to N-(a−12)) of an embodiment of an OFDM symbol 28, which may be transmitted by the base 10 of FIG. 3 and received by the client 12 of FIG. 3, or vice versa, where the OFDM symbol includes both training and data subsymbols. Although the base 10 is described as transmitting the OFDM signal in the example below, it is understood that this example would be similar if the client 12 were transmitting the OFDM signal.

The OFDM symbol 28 includes one or more clusters $L_D$ of data subcarriers, and one or more clusters $L_P$ of training subcarriers, which are hereinafter called "pilot" subcarriers. The transmitter of the base 10 may modulate the pilot subcarriers with respective pilot subsymbols. In an embodiment, the data clusters $L_D$ and the pilot clusters $L_P$ are arranged in alternating fashion (i.e., one after the other) such that each data cluster $L_D$ is separated from adjacent data clusters by at least one pilot cluster $L_P$, and such that each pilot cluster is separated from adjacent pilot clusters by at least one data cluster) within the OFDM symbol 28. As discussed below in conjunction with FIGS. 9-10B, because the client 12 receiver "knows" the pilot subsymbols ahead of time, the client may use the pilot subsymbols to more accurately estimate the channel 14 as it exists while the data subsymbols are being transmitted.

In an embodiment, each data cluster $L_D$ within the OFDM symbol 28 includes a same first number (e.g., sixteen) of data subcarriers, and each pilot cluster $L_P$ within the OFDM symbol includes a same second number (e.g., five or nine) of pilot subcarriers. For example, in the embodiment of FIG. 5, the illustrated pilot cluster $L_P$ includes five pilot subcarriers k=N-(a-3) to N-(a-7), and the other pilot clusters (not shown in FIG. 5) of the OFDM symbol 28 also each include five respective pilot subcarriers. But in another embodiment, a data cluster $L_D$ may include a different number of data subcarriers than another data cluster within the same OFDM symbol, and a pilot cluster $L_P$ may include a different number of pilot subcarriers than another pilot cluster within the same OFDM symbol. Furthermore, as discussed above, some of the data subcarriers may be unmodulated by a data subsymbol or may have zero amplitude (i.e., zero energy), and, as discussed below in conjunction with FIGS. 7-8, some of the pilot subcarriers may be unmodulated by a pilot subsymbol or may have zero energy. Moreover, a pilot cluster $L_P$ or a data cluster $L_D$ may "wrap around the ends" of the N subcarriers. For example, if there are N=128 subcarriers (k=0 to 127), then a pilot cluster $L_P$ may include five pilot subcarriers k=126, k=127, k=0, k=1, and k=2.

A designer of an OFDM receiver, such as the receiver in the client 12 (FIG. 3), may select the minimum number $N_P$ of pilot clusters $L_P$ in the OFDM symbol 28, and may select the minimum number $L_{PN}$ of pilot subcarriers $k_P$ within each pilot cluster, for an intended application of the receiver based on the generally expected conditions of the communication channel 14 (FIG. 3) and on a desired data-error rate. For example, for an application where the receiver may be used in a moving automobile, a designer may use the generally expected conditions of a communication channel between a ground-based transmitter and receiver that are moving relative to one another at speeds between approximately 0 and 150 miles per hour (although non-racing automobiles rarely travel at speeds approaching 150 miles per hour, if the transmitter and receiver are in respective automobiles that are moving in opposite directions, then the speed of one automobile relative to the other automobile may approach or exceed 150 miles per hour). And to maximize the number of data subcarriers in, and thus the data bandwidth of, the OFDM symbol 28, the designer may select the minimum number $N_P$ of pilot clusters $L_P$, and the minimum number $L_{PN}$ of pilot subcarriers $k_P$ within each pilot cluster, that he/she predicts will allow the receiver to estimate such a channel with an accuracy that is sufficient for the receiver to recover data within the desired error rate.

Figure 6:
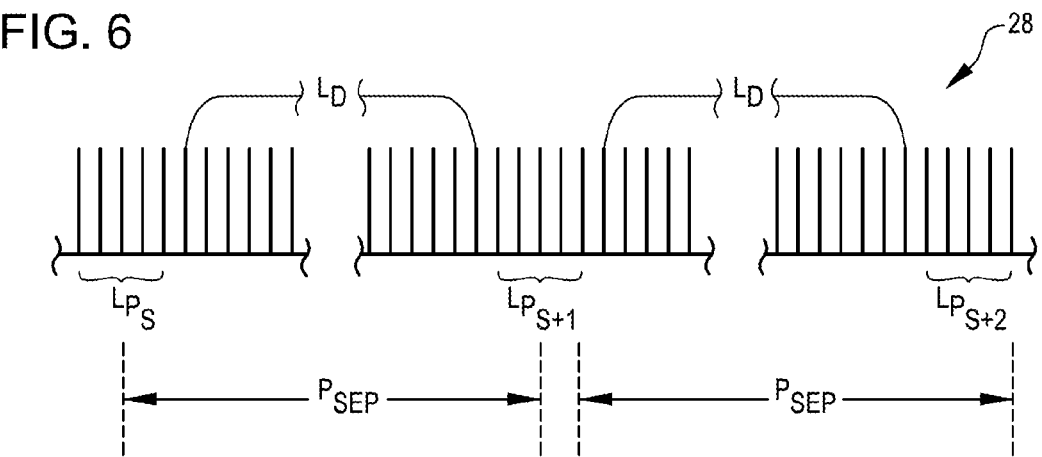
FIG. 6 is a plot of an embodiment of data clusters and pilot clusters generated by the presently transmitting transmitter-receiver of FIG. 3, where the pilot clusters have a uniform separation.

FIG. 6 is a frequency plot of some of the N subcarriers k of an embodiment of the OFDM symbol 28 of FIG. 5, where the frequency (x) axis of FIG. 6 has a lower resolution than the frequency (x) axis of FIG. 5.

In an embodiment, the pilot clusters $L_P$ are separated by a uniform separation value $P_{sep}$, which is the distance, measured in the number of subcarriers k, between a pilot subcarrier in a pilot cluster and a corresponding pilot subcarrier in an adjacent pilot cluster. That is, a pilot subcarrier that occupies a relative position within a pilot cluster $L_P$ is $P_{sep}$ subcarriers away from a pilot subcarrier that occupies the same relative position within an adjacent pilot cluster. For example, as shown in FIG. 6, the center pilot subcarrier (relative position 0) in pilot cluster $L_{PS}$ is separated from the center pilot subcarrier (also relative position 0) in the pilot cluster $L_{PS+1}$ by $P_{sep}$ subcarriers k. Also as shown in FIG. 6, the last pilot subcarrier (relative position +2 in this example in $L_{PS+1}$ is separated from the last pilot subcarrier (also relative position +2 in this example in the pilot cluster $L_{PS+2}$ by $P_{sep}$ subcarriers k. And, although not shown in FIG. 6, the very first pilot cluster $L_{PO}$ in the OFDM symbol 28 is separated from the very last pilot cluster $L_{P(Np-1)}$ in the OFDM symbol by $P_{sep}$ when this separation is calculated modulo N—calculating such separations modulo N yields accurate separation values if a pilot cluster $L_P$ or a data cluster $L_D$ "wraps around the ends" of the N subcarriers as discussed above.

Figure 7:
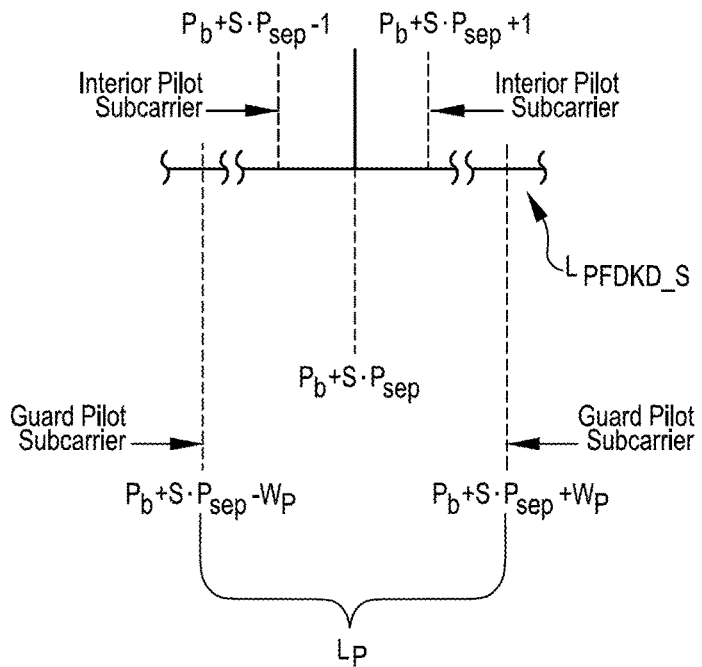
FIG. 7 is a plot of an embodiment of a pilot cluster.

FIG. 7 is a frequency plot of an embodiment of a Frequency-Domain Kronecker Delta (FDKD) pilot cluster $L_{PFDKD\_S}$.

Before substantive characteristics of the pilot cluster $L_{PFDKD\_S}$ are discussed, a convention for identifying a pilot cluster, such as the pilot cluster $L_{PFDKD\_S}$, and its pilot subcarriers is discussed. In this convention, $P_b$ identifies the relative location of the center subcarrier within the pilot cluster, S identifies the relative location of the pilot cluster within an OFDM symbol, $W_p$ is the total number of pilot subcarriers to the left and to the right of the center pilot subcarrier, $B_p$ is the number of interior pilot subcarriers to the left and to the right of the center pilot subcarrier, and $W_p-B_p$ is the number of guard pilot subcarriers $G_p$ at each end of the pilot cluster. For example, if a pilot cluster $L_{PFDKD\_S}$ includes $L_{PN}=5$ total pilot subcarriers and two guard pilot subcarriers, then $W_p=(5-1)/2=2$, $B_p=W_p-G_p=2-1=1$, and the pilot cluster $L_{PFDKD\_S}$ includes pilot subcarriers at the following relative locations: $P_b-2$, $P_b-1$, $P_b$, $P_b+1$, and $P_b+2$. And one may convert the relative-location identifiers into absolute-location identifiers by adding $S \cdot P_{sep}$ to each of the relative-location identifiers. So, continuing with the above example, the pilot cluster $L_{PFDKD\_S}$ includes pilot subcarriers at the following absolute locations: $P_b+S \cdot P_{sep}-2$, $P_b+S \cdot P_{sep}-1$, $P_b+S \cdot P_{sep}$, $P_b+S \cdot P_{sep}+1$, and $P_b+S \cdot P_{sep}+2$. And, therefore, again in this example, the pilot cluster $L_{PFDKD\_S}$ includes the following pilot subcarriers: $k_{Pb+S \cdot Psep-2}$, $k_{Pb+S \cdot Psep-1}$, $k_{Pb+S \cdot Psep}$, $k_{Pb+S \cdot Psep+1}$, and $k_{Pb+S \cdot Psep+2}$. For example, if each pilot cluster $L_{PFDKD\_S}$ in an OFDM symbol includes $L_{PN}=5$ pilot subcarriers, $P_{sep}=8$, and the first pilot subcarrier of the zero$^{th}$ pilot cluster $L_{PFDKD\_0}$ (S=0) is $k_0$, then $P_b=2$, $W_p=2$, and the sixth pilot cluster $L_{PFDKD\_6}$ (S=6 and counting in a direction from the lowest to the highest subcarrier frequency) includes the following pilot subcarriers: $k_{48}$, $k_{49}$, $k_{50}$, $k_{51}$, and $k_{52}$.

Still referring to FIG. 7, in an embodiment, the center subcarrier $k_{Pb+S \cdot Psep}$ (solid line in FIG. 7) of an FDKD pilot cluster $L_{PFDKD\_S}$ is modulated with a non-zero pilot subsymbol, and all of the other subcarriers (dashed lines) have zero energy; that is, all of the other subcarriers are effectively modulated with a zero pilot subsymbol equal to 0+j0. Therefore, in a FDKD pilot cluster $L_{PFDKD\_S}$, the only energy transmitted within the pilot cluster $L_{PFDKD\_S}$ is transmitted on the center subcarrier $k_{Pb+S\cdot Psep}$; the remaining subcarriers in the pilot cluster are transmitted with zero energy. But for reasons discussed above in conjunction with FIG. 4, at the receiver, subcarriers of the pilot cluster $L_{PFDKD\_S}$ other than the center subcarrier may carry non-zero energy due to Doppler Spread. And, as discussed below in conjunction with FIGS. 9-10, the energy carried by the interior pilot subcarriers at the receiver may allow the receiver to generate an estimate of the communication channel as it exists during transmission of an OFDM symbol, where the estimate takes into account ICI caused by Doppler Spread. The guard pilot subcarriers are included to provide a guard band that reduces to negligible levels the amount of energy from data subcarriers that "spills over" into the center and interior pilot subcarriers, and vice-versa. One may select the total number $L_{PN}$ of pilot subcarriers and the number $G_P$ of guard pilot subcarriers in a pilot cluster $L_P$ for a particular application based on the expected Doppler Spread. Typically, the larger the expected Doppler Spread, the larger the total number $L_{PN}$ of pilot subcarriers and the number $G_p$ of guard pilot subcarriers, and the smaller the expected Doppler Spread, the smaller the total number $L_{PN}$ of pilot subcarriers and the number $G_p$ of guard pilot subcarriers ($G_p$ may even equal zero).

Figure 8:
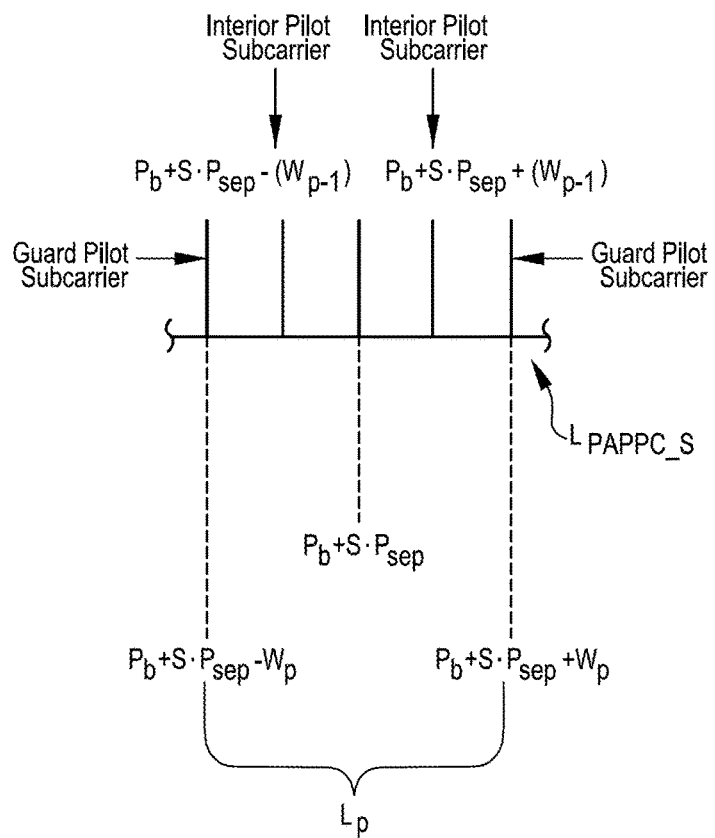
FIG. 8 is a plot of another embodiment of a pilot cluster.

FIG. 8 is a frequency plot of an embodiment of an All-Pilot Pilot Cluster (APPC) $L_{PAPPC\_S}$. Unlike the FDKD pilot cluster $L_{PFDKD\_S}$ of FIG. 7 in which only the center subcarrier $k_{Pb+S\cdot Psep}$ is modulated with a non-zero pilot subsymbol, in an APPC pilot cluster $L_{PAPPC\_S}$, all of the pilot subcarriers (solid lines) $k_{Pb+S\cdot Psep-Wp}$-$k_{Pb+S\cdot Psep+Wp}$ are modulated with a respective non-zero pilot subsymbol. That is, energy is transmitted on all of the pilot subcarriers $k_{Pb+S\cdot Psep-Wp}$-$k_{Pb+S\cdot Psep+Wp}$ within an APPC pilot cluster. Furthermore, the pilot subcarriers $k_{Pb+S\cdot Psep-Wp}$-$k_{Pb+S\cdot Psep+Wp}$ of an APPC pilot cluster may each be modulated with the same, or with different, pilot subsymbols. And differences between the transmitted pilot subsymbols (which are known ahead of time by the receiver) and the respective received pilot subsymbols may allow the receiver to generate an estimate of the communication channel as it exists during transmission of an OFDM symbol, where the estimate takes into account ICI caused by Doppler Spread.

Figure 9:
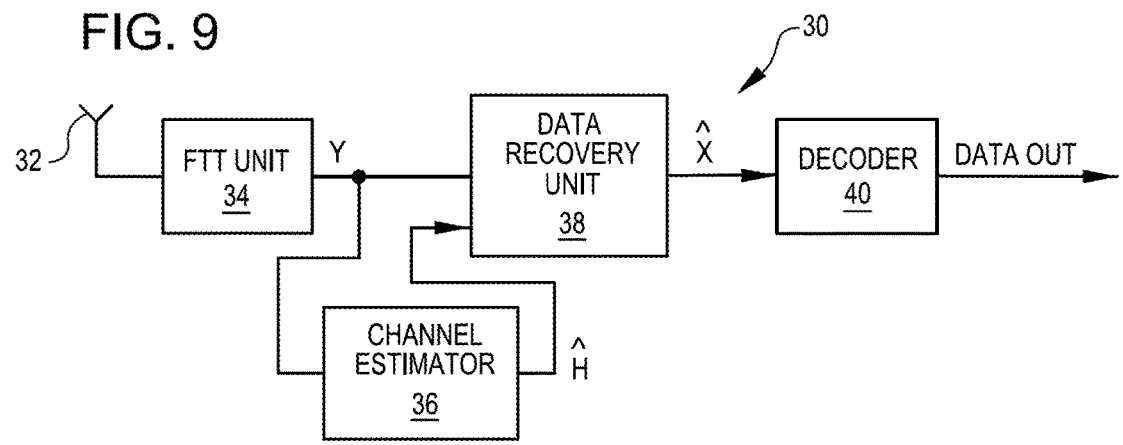
FIG. 9 is a block diagram of an embodiment of the receiver of one or both of the base and client transmitter-receivers of FIG. 3.

FIG. 9 is a block diagram of an embodiment of a receiver 30 for a mobile OFDM device such as the base 10 or client 12 of FIG. 3.

The receiver 30 includes a receive antenna 32, a Fast Fourier Transform (FFT) unit 34, a channel estimator 36, a data-recovery unit 38, and a decoder 40. The FFT unit 34, channel estimator 36, data-recovery unit 38, and decoder 40 may each be implemented in software, hardware, or a combination of software and hardware. For example, one or more of the FFT unit 34, the channel estimator 36, the data-recovery unit 38, and the decoder 40 may be implemented on an integrated circuit (IC), and other components, such as a transmitter, may also be implemented on the same IC, either on a same or different IC die. And this IC may be combined with one or more other ICs (not shown in FIG. 9) to form a system such as the base 10 or client 12 of FIG. 3. Or, one or more of these components may be implemented by a software-executing controller such as a processor.

The receive antenna 32 may receive one or more OFDM symbols from a transmitter, such as the transmitter of the base 10 or client 12 of FIG. 3, where at least some of the subcarrier signals may experience Doppler Spread. The antenna 32 may also function to transmit OFDM symbols generated by a transmitter (not shown in FIG. 9) of the OFDM device that incorporates the receiver 30. That is, the antenna 32 may function to both receive and transmit OFDM symbols.

The FFT unit 34 conventionally converts a received OFDM symbol from a time-domain waveform into an N×1 column vector y of complex frequency-domain coefficients (e.g., one complex coefficient for each subcarrier).

The channel estimator 36 estimates the response of the communication channel (e.g., the channel 14 of FIG. 3) from the coefficients of the vector y corresponding to the pilot subcarriers, which, as discussed above in conjunction with FIGS. 5-8, are the subcarriers that compose the training portion of the received OFDM symbol. From these pilot-subcarrier coefficients, the estimator 36 generates an N×N channel-estimation matrix $\hat{H}$ of complex frequency coefficients that collectively approximate the effective frequency response H of the communication channel—the effective frequency response may take into account the affect of, e.g., channel conditions such as temperature and humidity, the existence of multiple transmission paths, and the Doppler Spread, at each of the subcarrier frequencies $f_k$. Because, as discussed above, the Doppler Spread may cause energy from one subcarrier to spill over into the frequency slot of another subcarrier at the receiver 30, the matrix $\hat{H}$ may not be a diagonal matrix—a matrix is diagonal if all of its elements are zero except for the elements that lie along the main diagonal that extends from the top left corner of the matrix. An embodiment of the channel estimator 36, and an embodiment of a technique for generating the channel-estimation matrix $\hat{H}$, are discussed below in conjunction with FIG. 10.

The data-recovery unit 38 recovers the data carried by the OFDM symbol as transmitted by generating an N×1 column vector $\hat{x}$, which is an estimation of the transmitted OFDM data symbol. That is, $\hat{x}$ includes complex coefficients (one for at least each data subcarrier) that are estimates of the complex coefficients with which the transmitter modulated the transmitted data subcarriers. The unit 38 may generally recover $\hat{x}$ according to the following equations:

$$y = \hat{H}\hat{x} + n \qquad (1)$$

$$\hat{H}^{-1}(y) = \hat{H}^{-1}\hat{H}\hat{x} + \hat{H}^{-1}n = \hat{x} + \hat{H}^{-1}n \qquad (2)$$

where n is an N×1 column vector of Additive-White-Gaussian-Noise (AWGN) complex coefficients at each of the subcarrier frequencies. Because, as discussed above, some of the y coefficients are for pilot subcarriers that are used only for channel-estimation purposes, the elements of $\hat{H}$, $\hat{x}$, y, and n that correspond to the $N_pL_{PN}$ pilot subcarriers (where $N_p$ is the number of pilot clusters $L_p$ in the OFDM symbol and $L_{PN}$ is the number of pilot subcarriers per pilot cluster $L_P$) may be discarded prior to calculating $\hat{H}^{-1}$ and solving equation (2) so as to reduce the complexity, and increase the speed, of the calculation of $\hat{x}$. Examples of a data-recovery unit and data-recovery techniques that may be used as and by the data-recovery unit 38 are disclosed in U.S. patent application Ser. Nos. 12/579,935 and 12/579,969, which were filed on Oct. 15, 2009 and which are incorporated by reference. And conventional data-recovery units and techniques that may be respectively used as and by the data-recovery unit 38 also exist.

The data decoder 40 effectively uses the $\hat{x}$ coefficients that correspond to the data subcarriers of the OFDM symbol to demodulate the corresponding data subsymbols, and to thus recover the data represented by the subsymbols. For example, if the transmitter modulated a data subcarrier by mapping it to a respective QPSK constellation element, then the data decoder 40 QPSK demodulates the data subcarrier to recover the same constellation element, which represents the bits of data carried by the modulated data subcarrier.

Still referring to FIG. 9, although conventional channel estimators exist, such a channel estimator may require a relatively long processing time to determine the channel-estimation matrix $\hat{H}$. For example, a significant portion of the processing time consumed by a conventional channel estimator may be due to the calculating of one or more inverted matrices in real time as part of the algorithm for determining $\hat{H}$.

And referring to FIGS. 3 and 9, a conventional channel estimator may also be unable to account for changes in the number Z of the paths L that compose the communication channel 14, for changes in the respective delays of these paths, and for changes in the respective portions of the OFDM signal energy carried by these paths.

Over a period of time that may be much longer than a single OFDM symbol period (e.g., approximately 100-300 OFDM symbol periods), the number Z of paths L may change. The change in the number of paths L may be due to changes in the channel conditions, such as changes in the number of OFDM-signal-reflecting objects within or near the channel 14.

Furthermore, over the same period, the delays of the paths L, and the portions of the OFDM signal energy carried by the paths L, may also change. Each path L is defined by the delay it has relative to the zero$^{th}$ path $L_0$ having zero delay. That is, the zero-delay path $L_0$ is the path over which a version of an OFDM signal, having a respective portion of the energy of the transmitted OFDM signal, first reaches the receiver; other versions of the OFDM signal reach the receiver over the remaining paths L at the respective delay times (relative to the delay of the path $L_0$) that define those paths, and with respective portions of the transmitted energy. The delay time of a path L may be defined in units of the OFDM-signal sampling time employed by the receiver. For example, when a version of an OFDM signal propagates over a path $L_l$ having a delay value of 1.0, this signal version first reaches the receiver one sample time, or one sample, after the version of the OFDM signal that is propagating over the path $L_0$ first reaches the receiver. Likewise, when a version of an OFDM signal propagates over a path $L_l$ having a delay value of 3.5 samples, this signal version first reaches the receiver three-and-one-half samples after the version of the OFDM signal that is propagating over the path $L_0$ first reaches the receiver. To account for these delayed one or more paths L, the transmitter (not shown in FIG. 9) may add a cyclic prefix to the transmitted signal, where this prefix includes a number of samples, the aggregate delay of which is at least as long as the longest path delay. For example, if the path L with the longest delay has a delay of 3.5 samples, then the transmitter may add a cyclic prefix of four samples to the transmitted signal, such that the transmitted signal includes N+4 samples (as above, N is the total number of transmitted subcarriers k). These four extra samples are actually the last four samples of the signal to be transmitted, and are effectively repeated at the beginning of the signal transmission to be sure that by the time that the last signal sample arrives at the receiver over the zero$^{th}$-delay path $L_0$, the receiver has also received over the remaining paths all of the samples of the signal at least one time (because the signal is a periodic time-domain signal, receiving a sample of the signal more than one time typically has no negative affect at the receiver).

Unfortunately, a channel estimator that does not account for changes in at least one of the number, delays, and energies of the paths L may be unable to determine the channel-estimation matrix $\hat{H}$ with an accuracy sufficient for some applications such as mobile OFDM.

Figure 10:
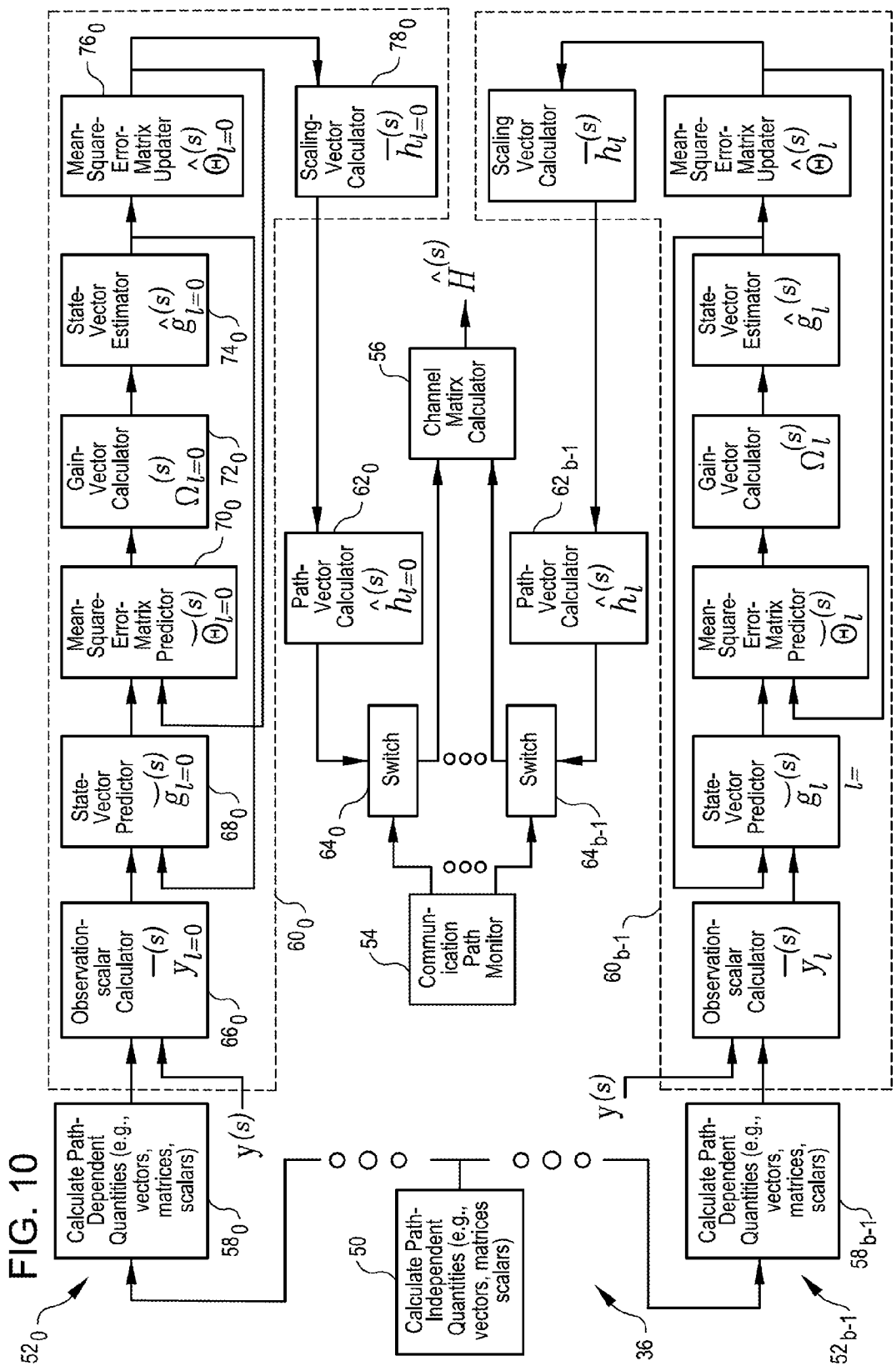
FIG. 10 is a block diagram of an embodiment of the channel estimator of FIG. 9.

FIG. 10 is a block diagram of the channel estimator 36 of FIG. 9, where the channel estimator may determine the channel-estimation matrix $\hat{H}$ recursively, without calculating the inverse of a matrix in real time (or otherwise), and by accounting for changes in the number, delays, and/or energies of the paths L that compose the communication channel 14 (FIG. 3).

The estimator 36 includes a first stage 50 for determining path-independent quantities, b parallel second stages $52_0$-$52_{b-1}$ for respectively determining column vectors $h_l^{(s)}$ that describe the time-domain response of the Z paths L of the channel 14 (FIG. 3) during a symbol period s, a communication-path monitor 54 for monitoring the number and delays of the channel paths L, and a channel-matrix calculator 56 for determining the channel-estimation matrix $\hat{H}^{(s)}$ for the symbol period s.

The first stage 50 determines quantities that are independent of any particular channel path L, and that may be used by the second and third stages 52 and 56. Examples of, and techniques for determining, such quantities are discussed below.

Each of the second stages 52 determines a respective time-domain path vector $h_l^{(s)}$ for a respective one of the Z paths $l=L_0-l=L_{z-1}$. The number b of second stages 52 depends on the path delays that the channel 14 (FIG. 3) may possibly have for a particular application. For example, suppose that even though it is anticipated that the channel 14 will not have more than Z=4 simultaneous paths L during a symbol period s, the delays of these paths may range from 0 to 4 samples in increments of 0.25 samples, for a total of 4×1/(0.25)=16 possible path delays. Therefore, in such an example, the channel estimator 36 would include b=16 second stages $52_0$-$52_{15}$, one stage for each of the anticipated sixteen path delays, respectively. As discussed below, the path monitor 54 engages the second stages 52 corresponding to the delays of the paths L present in the channel 14.

Each second stage 52 includes a first substage 58, a second substage 60, a third substage 62, and an engage/disengage switch 64.

Each first substage 58 is for determining quantities that are dependent on the particular channel path L associated with the second stage, and that may be used by the corresponding second substage 60. Examples of, and techniques for calculating, such quantities are discussed below.

Each second substage 60 may include a respective recursive filter, such as a Vector State Scalar Observation (VSSO) Kalman filter, which may increase the accuracy of the respective determined vector $h_l^{(s)}$ without increasing the complexity (or even reducing the complexity) of the channel estimator 36 as compared to prior channel estimators. The recursive-filter substage 60 may increase the accuracy of $h_l^{(s)}$ by effectively using information from preceding symbol periods to determine $h_l^{(s)}$ for a current symbol period s. For example, referring to FIG. 3, suppose that the client 12 is moving at an approximately constant velocity relative to the base 10; therefore, from symbol period to symbol period, one would expect the Doppler Spread to be approximately the same. Without the recursive-filter substage 60, the second stage 52 may allow an anomaly, such as a noise "spike," during a symbol period s to introduce a significant error into the path vector $h_l^{(s)}$, because the second stage has no way to "know" that the Doppler Spread is approximately constant relative to prior symbol periods. But because the recursive-filter substage 60 may track the trend (e.g., approximately constant Doppler Spread) of the response of the path L, it may allow the second stage 52 to lessen, or even eliminate, the error that an anomaly may introduce into $h_l^{(s)}$. Furthermore, one may design the recursive-filter stage 60 such that it does not perform a matrix inversion; for example, a VSSO Kalman filter may be designed so that it does not perform a matrix inversion. This may reduce the complexity of each second stage 52, and thus may reduce the overall complexity of the channel estimator 36 as compared to conventional channel estimators. An embodiment of a recursive-filter substage 60 is described below.

Each third substage 62 determines the respective path vector $h_l^{(s)}$ in response to the second substage 60 as described below.

The communication-path monitor 54 tracks changes to the number, delays, and energies of the communication paths L, and periodically adjusts which of the second stages 52 are engaged and disengaged based on the delays and numbers of paths L that are currently present in the channel 14 (FIG. 3). For example, if the path monitor 54 determines that the channel 14 currently has Z=4 active paths L having relative delays of 0.0 (the zero-delay path typically is always present), 0.25, 1.25, and 2.0 respectively, then the path monitor engages the second stages 52 corresponding to these delays via respective switches 64, and disengages the remaining second stages via respective switches 64. The path monitor 54 determines which paths are active (i.e., present for purposes of the receiver 30 of FIG. 9) by monitoring the energies of the paths and comparing the energies to a path threshold. If a path's energy is greater than the threshold, then the corresponding path is active/present; otherwise, the corresponding path is inactive/not present. An embodiment of the path monitor 54 is further described in U.S. patent application Ser. No. 12/963,569, which is incorporated by reference.

The third stage 56 generates the channel-estimation matrix $\hat{H}$ in response to the path vectors $h_l^{(s)}$ from the second stages 52 that the communication-path monitor 54 engages.

An embodiment of the second recursive-filter substage $60_0$ of the second stage $52_0$ is now described where the substage $60_0$ includes a VSSO Kalman filter, it being understood that the second substages $60_1$-$60_{b-1}$ may be similar.

The VSSO-Kalman-filter substage $60_0$ includes an observation scalar calculator $66_0$, a state-vector predictor $68_0$, a mean-square-error-matrix predictor $70_0$, a gain-vector calculator $72_0$, a state-vector estimator $74_0$, a mean-square-error-matrix updater $76_0$, and a scaling-vector calculator $78_0$; these components are described below.

Before describing the operation of an embodiment of the channel estimator 36 of FIG. 10, some channel-estimation-related quantities, and the mathematical relationships between some of these quantities, are described. All of the quantities and relationships described below assume that APPC pilot clusters (each including the same pilot symbol from pilot subcarrier to pilot subcarrier and from pilot cluster to pilot cluster as discussed above in conjunction with FIG. 8) are used unless otherwise noted.

$$h_l^{(s)}=[h_l(\underline{s}), \ldots, h_l(\underline{s}+N-1)]^T \qquad (3)$$

where $h_l^{(s)}$ is the column vector that represents the time-domain response of the path l=L during the $s^{th}$ OFDM symbol period, $\underline{s}$ is the first sample time after the cyclic prefix (if there is a cyclic prefix) in the $s^{th}$ OFDM symbol period, and N is the number of subcarriers k (both pilot and data subcarriers) in the transmitted OFDM signal. For example, if N=128, s=1 ($2^{nd}$ OFDM symbol), and the cyclic prefix has four samples, then the transmitted OFDM signal carrying the $2^{nd}$ OFDM symbol has a total of 128+4=132 samples, $\underline{s}$ represents the 268th sample time (where the sample times are numbered continuously starting with the $1^{st}$ OFDM symbol s=0), and $h_l^{(s)}$ includes one hundred twenty eight complex elements corresponding to the samples 268-395.

In at least some applications, the elements of $h_l^{(s)}$ may be approximated as fitting a curve such as a straight line. Therefore, the elements of $h_l^{(s)}$ may be represented in terms of a polynomial that describes the curve. For example, where the curve is a straight line, which one may represent with the equation y=mx+b where m is the slope of the line and b is the y-axis intercept, $h_l^{(s)}$ may be similarly represented in terms of an offset and slope according to the following equation:

$$h_l^{(s)}=B\bar{h}_l^{(s)} \qquad (4)$$

where B is a binomial expansion matrix having elements m, n arranged in Q columns such that $B(m,n)=m^n$ (m is the row number and n is the column number), and $\bar{h}_l^{(s)}$ is a scaling column vector having Q rows/elements; consequently, where the fitting curve is a straight line, $$B = \begin{bmatrix} 1 & 0 \\ \vdots & \vdots \\ 1 & N-1 \end{bmatrix}$$

and $\bar{h}_l^{(s)}$ is a column vector with Q=2 elements that respectively represent offset and slope. Because typically Q<<N, $\bar{h}_l^{(s)}$ is typically much smaller, and easier to manipulate, than $h_l^{(s)}$.

The state vector $g_l^{(s)}$ for the engaged filter substage 60 corresponding to the $l^{th}$ path during the symbol period s is given by the following equation:

$$g_l^{(s)}=[\bar{h}_l^{(s-M+1)T}, \ldots, \bar{h}_l^{(s)T}]^T \qquad (5)$$

where M, an integer, is the filter prediction order that provides a filter substage 60 with its recursive feature. For example, to design a filter substage 60 for calculating the state vector $g_l^{(s)}$ using information from the current symbol period and the previous three symbol periods, a designer would set M=4. Generally, the higher the prediction order M, the more accurate the filter substage 60 but the longer its latency; conversely, the lower the value of M, generally the less accurate the filter substage, but the shorter the latency.

The state equation for the engaged filter substage 60 corresponding to the $l^{th}$ path relates the $l^{th}$ path during the current symbol period s to the same $l^{th}$ path during one or more prior symbol periods, and is as follows:

$$g_l^{(s)}=Ag_l^{(s-1)}+e_l^{(s)} \qquad (6)$$

where A is an autoregressive matrix and e is the prediction-error vector. A is dependent on the Doppler Spread, and, therefore, the first stage 50 may determine values of A ahead of time in a conventional manner and store these values in a lookup table (e.g., part of the first stage 50 or external thereto), which the first stage may access based on the velocity of the receiver relative to the transmitter; for example, the receiver may determine this velocity using a GPS device. Alternatively, the channel estimator 36 may include a conventional linear-adaptive filter (not shown in FIG. 10) that conventionally looks at the pilot symbols recovered by the receiver for one or more prior symbol periods, predicts the pilot symbols to be recovered for the current symbol period s based on the current velocity of the receiver relative to the transmitter, and predicts the value of the A matrix based on the previously recovered pilot symbols and the predicted pilot symbols.

The prediction-error-correlation matrix $G_l$ is given by the following equation:

$$G_l = E\{e_l^{(s)} e_l^{(s)H}\} \tag{7}$$

Although the vector $e_l^{(s)}$ may be unknown, its expectation (the right side of equation (7)), which may be generally described as an average of the change in the variance of $e_l^{(s)}$ from symbol period to symbol period, depends on the Doppler Spread, and, therefore, may be conventionally determined ahead of time through simulations or with a closed-form expression; because this expectation is the same from symbol period s to symbol period s, $G_l$ does not depend on s. Consequently, the first substage 58 may determine values for $G_l$ dynamically or ahead of time, and/or store these values of $G_l$ in a lookup table with respect to Doppler Spread, and may retrieve from the lookup table a value of $G_l$ for the current symbol period based on the velocity of the receiver relative to the transmitter during the current symbol period.

A path-dependent $1\times(2w_p+1)$ row vector $u_l$, which the first substage 58 may calculate and/or store dynamically or ahead of time, is given by the following equation:

$$u_l = \left[ e^{-\frac{j2\pi w_p l}{N}} e^{-\frac{j2\pi(w_p-1)l}{N}} \ldots 1 \ldots e^{\frac{j2\pi w_p l}{N}} \right] \tag{8}$$

A path-independent matrix W, which the first stage 50 may calculate and/or store dynamically or ahead of time, is given by the following equation:

$$W = \begin{bmatrix} F^H(\langle N + w_p \rangle, : ) \\ F^H(\langle N + w_p - 1 \rangle, : ) \\ \vdots \\ F^H(\langle N - w_p \rangle, : ) \end{bmatrix} \tag{9}$$

where F is the known Fourier matrix, the "$\langle \ \rangle$" operator indicates a modulo N operation, and ":" indicates all columns of the matrix $F^H$ in the indicated rows. Note that the number of rows in the W matrix is equal to the number of pilot subcarriers $L_{PN}$ in each transmitted/received pilot cluster $L_p$.

A path-dependent $1\times(MQ)$ row vector $q_l^H$, which the first substage 58 may calculate and/or store dynamically or ahead of time, is given by the following equation:

$$q_l^H = \frac{PN_p}{N} [\, 0_{1\times(M-1)Q} \ \ u_l WB \,] \tag{10}$$

where P is the pilot symbol (which is mapped to all pilot subcarriers in an embodiment) in the frequency domain, and $0_{1\times(M-1)Q}$ is a row vector having (M−1)Q columns/elements that are each equal to zero.

A path-independent $N_P\times Z$ Fourier matrix $F_L$, which the first stage 50 may calculate and/or store dynamically or ahead of time for the expected values of Z, is given by the following equation:

$$F_L = F(p^{(0)}, 0:Z-1) \tag{11}$$

where "$p^{(0)}$" indicates that $F_L$ includes the $N_P$ rows of the Fourier matrix F corresponding to the positions of the center pilot subcarriers of the pilot clusters $L_p$ in the transmitted/received OFDM symbol, and "0:Z−1" indicates that $F_L$ includes columns 0–Z−1 of F, where Z is the number of paths L present in the channel during the symbol period s.

The observation scalar $\overline{y}_l^{(s)}$ for the engaged filter substage 60 corresponding to the $l^{th}$ path is given by the following equation:

$$\overline{y}_l^{(s)} = F_L^H(l,:) y^{(s)}(p^{(0)}) \tag{12}$$

where $y^{(s)}$ is the received-signal column vector in the frequency domain during the symbol period s, and "$p^{(0)}$" indicates that $y^{(s)}(p^{(0)})$ includes only the elements of $y^{(s)}$ that correspond to the center pilot subcarriers of the transmitted/received pilot clusters $L_p$. Although here only the center subcarrier of each pilot cluster is used to generate $\overline{y}_l^{(s)}$, other embodiments may use different and/or more subcarriers within each pilot cluster to generate $\overline{y}_l^{(s)}$.

The measurement equation for the engaged filter substage 60 corresponding to the $l^{th}$ path is given by the following equation:

$$\overline{y}_l^{(s)} = q_l^H g_l^{(s)} + \overline{n}_l^{(s)} \tag{13}$$

where $\overline{n}_l$ is the noise due to, e.g., interference on the pilot subcarriers from the data subcarriers and Additive White Gaussian Noise (AWGN). Although $\overline{n}_l^{(s)}$ may be unknown ahead of time, the first substage 58 associated with the $l^{th}$ path may compute its expectation/variance $\overline{\sigma}_l^2 = E\{|\overline{n}_l^{(s)}|^2\}$ dynamically or ahead of time by simulation or as a closed-form expression in a conventional manner, and may use $\overline{\sigma}_l^2$ as described below.

Referring to equation (12) and as further discussed below, the measurement equation effectively relates the symbol recovered during the symbol period s to the channel response during s, and, referring to equation (13) and also as further discussed below, the state equation (6), via the state vector $g_l^{(s)}$, effectively modifies the result $\overline{y}_l^{(s)}$ given by the measurement equation (12) based on the channel response during one or more prior symbol periods. Furthermore, because $\overline{y}_l^{(s)}$ is a scalar, as discussed below, the filter substage 60 does not invert a matrix, which significantly reduces the overall complexity of the channel estimator 36 as compared to conventional channel estimators.

Still referring to FIG. 10, the operation of an embodiment of the channel estimator 36 is described in terms of the second stage 52$_0$, it being understood that the operations of the other second stages 52 may be similar. Furthermore, in an embodiment, at least one path L having a relative delay of zero is always present in the channel 14 (FIG. 3), and the second stage 52$_0$ is designed to determine $h_{l=0}^{(s)}$ for the $l=L_0=0$ path having a delay of zero; therefore, in such an embodiment, the path monitor 54 always engages the second stage 52$_0$ for the path $l=L_0=0$ having a delay of zero. Moreover, in the example below, the elements of $h_l^{(s)}$ are fitted to a straight line as described above.

First, the path monitor 54 determines the number Z and corresponding delays of the paths L that compose the channel 14 (FIG. 3), and engages, via the switches 64, the second stages 52 that correspond to these paths. As discussed above, for purposes of the following example, it is assumed that the path monitor 54 has engaged at least the second stage 52$_0$.

Next, the first stage 50 may determine and/or store quantities (at least some of which are described above) that the second stage $52_0$ may need for its calculations, to the extent that the first stage has not already determined and/or stored these quantities.

Similarly, the first substage $58_0$ may determine and/or store quantities (at least some of which are described above) that the filter substage $60_0$ may need for its calculations, to the extent that the first substage has not already determined and/or stored these quantities.

Next, the observation-scalar calculator $66_0$ determines the observation scalar $\bar{y}_l^{(s)}$ for l=0 according to equation (12).

Then, the state-vector predictor $68_0$ determines the predicted state vector $\check{g}_l^{(s)}$ for l=0 according to the following equation:

$$\check{g}_l^{(s)} = A\hat{g}_l^{(s-1)} \quad (14)$$

Where s=0 (the initial symbol period), the predictor $68_0$ also provides an initial value for $\hat{g}_l^{(-1)}$. This initial value may be zero, or it may be the expectation of $\hat{g}_l^{(-1)}$. If the initial value is the latter, the predictor $68_0$ may compute the expectation of $\hat{g}_l^{(-1)}$ dynamically or ahead of time and store the computed expectation. A technique for calculating the expectation of $\hat{g}_l^{(-1)}$ is described in S. M. Kay, "Fundamentals of Statistical Signal Processing: Estimation Theory," Prentice Hall: New Jersey (1993), which is incorporated by reference. After the initial symbol period s=0, the state-vector estimator $74_0$ provides $\hat{g}_l^{(s)}$, which becomes $\hat{g}_l^{(s-1)}$ for the next symbol period s as discussed below.

Next, the mean-square-error-matrix predictor $70_0$ determines the predicted mean-square-error matrix $\check{\theta}_l^{(s)}$ for l=0 according to the following equation:

$$\check{\theta}_l^{(s)} = A\hat{\theta}_l^{(s-1)}A^H + G_l \quad (15)$$

Where s=0 (the initial symbol period), the predictor $70_0$ also provides an initial value for $\hat{\theta}_l^{(-1)}$. This initial value may be zero, or it may be the expectation of the error variance in the state equation (6). If the initial value is the latter, then the predictor $70_0$ may compute the expectation of the error variance in the state equation dynamically or ahead of time store the computed expectation. A technique for calculating the expectation of the error variance in the state equation (6) is described in S. M. Kay, "Fundamentals of Statistical Signal Processing: Estimation Theory," Prentice Hall: New Jersey (1993), which is incorporated by reference. After the initial symbol period s=0, the mean-square-error-matrix updater $76_0$ provides $\hat{\theta}_l^{(s)}$, which becomes $\hat{\theta}_l^{(s-1)}$ for the next symbol period s as discussed below.

Then, the gain-vector calculator $72_0$ determines a gain vector $\Omega_l^{(s)}$ for l=0 according to the following equation:

$$\Omega_l^{(s)} = \frac{\check{\theta}_l^{(s)} q_l}{\sigma_l^2 + q_l^H \check{\theta}_l^{(s)} q_l} \quad (16)$$

Next, the state-vector estimator $74_0$ generates the estimated state vector $\hat{g}_l^{(s)}$ for l=0 according to the following equation:

$$\hat{g}_l^{(s)} = \check{g}_l^{(s)} + \Omega_l^{(s)}[\bar{y}_l^{(s)} - q_l^H \check{g}_l^{(s)}] \quad (17)$$

As discussed above, $\hat{g}_l^{(s)}$ is fed back to the state-vector predictor $68_0$ to be used in equation (14) as $\hat{g}_l^{(s-1)}$ for the next symbol period.

Then, the mean-square-error-matrix updater $76_0$ generates an updated mean-square-error matrix $\hat{\theta}_l^{(s)}$ for l=0 according to the following equation:

$$\hat{\theta}_l^{(s)} = [I_{MQ} - \Omega_l^{(s)} q_l^H]\check{\theta}_l^{(s)} \quad (18)$$

where $I_{MQ}$ is an identity matrix of dimensions M(row)×Q (column). Furthermore, as discussed above, $\hat{\theta}_l^{(s)}$ is fed back to the mean-square-error-matrix predictor $70_0$ to be used in equation (15) as $\hat{\theta}_l^{(s-1)}$ for the next symbol period.

Next, the scaling-vector calculator $78_0$ determines the scaling vector $\bar{h}_l^{(s)}$ for l=0 and for a straight-line approximation of the elements of $h_l^{(s)}$ according to one of the two following equations:

$$\bar{h}_l^{(s)} = \hat{g}_l^{(s)}(MQ-Q:MQ-1) \quad (19)$$

$$\bar{h}_l^{(s-M)} = \hat{g}_l^{(s)}(0:Q-1) \quad (20)$$

Equation (19) may be referred to as the normal Kalman filter (NKF) output, and equation (20) may be referred to as the Kalman fixed-lag smoother (KFLS) output, which is effectively a low-pass filtered output. Generally, the KFLS output is more accurate, but has a higher latency, than the NKF output.

Then, the third stage path-vector calculator $62_0$ determines the path vector $h_l^{(s)}$ for l=0 according to equation (4) using either $\bar{h}_l^{(s)}$ from equation (19) or $\bar{h}_l^{(s-M)}$ from equation (20).

As stated above, the other engaged second stages 52 may operate in a similar manner to generate $\bar{h}_l^{(s)}$ for the paths $L_1 \le l \le L_{Z-1}$ to which they correspond. Typically, all engaged second stages 52 generate $\bar{h}_l^{(s)}$ according to equation (19) or equation (20) for a symbol period s, although it is contemplated that some second stages may generate $\bar{h}_l^{(s)}$ according to equation (19) while other second stages may generate $\bar{h}_l^{(s)}$ according to equation (20) for a symbol period s.

Next, the third stage channel-matrix calculator 56 generates an intermediate channel-estimation matrix $\hat{\underline{H}}^{(s)}$ from the path-response vectors $h_l^{(s)}$ for all of the paths $L_0 \le l \le L_{Z-1}$ that compose the channel 14 (FIG. 3) according to the following equation:

$$\hat{\underline{H}}^{(s)}(m,n) = \hat{h}_{(n-n)}^{(s)}(s+m), \text{ for } 0 \le m \le N-1 \text{ and } 0 \le n \le N-1 \quad (21)$$

Then, the third stage channel-matrix calculator 56 generates the channel-estimation matrix $\hat{H}^{(s)}$ according to the following equation:

$$\hat{H}^{(s)} = \frac{1}{N} F\hat{\underline{H}}^{(s)} F^H \quad (22)$$

Still referring to FIG. 10, alternate embodiments of the channel estimator 36 are contemplated. For example, the functions contributed to any of the components of the channel estimator 36 may be performed in hardware, software, or a combination of hardware and software, where the software is executed by a controller such as a processor. Furthermore, although described as VSSO Kalman filters, one or more of the second substages 60 may be another type of recursive filter, for example, another type of recursive filter that is designed to perform no matrix inversions. Moreover, although described as operating in response to APPC pilot clusters (FIG. 9), the channel estimator 36 may be modified (e.g., by modifying some or all of the above equations according to known principles) to operate in response to FDKD pilot clusters (FIG. 8). Furthermore, instead of, or in addition to, disengaging the unused second stages 52, the path monitor 54 may cause these unused second stages to enter a low- or no-power mode to save power.

Referring to FIGS. 1-10, as discussed above, an OFDM system such as shown in FIG. 3 forms a single multipath channel 14 between a single antenna of the base 10 and a single antenna of client 12, where during each OFDM symbol period, the transmitting one of the base and client transmits one OFDM symbol over this channel.

To increase the data-transmission rate relative to an OFDM system such as described above in conjunction with FIGS. 1-10, engineers have developed a Multiple-Input-Multiple-Output (MIMO)-OFDM system that forms multiple channels between the base and client, where, during each symbol period, the transmitting one of the base and client transmits a respective OFDM symbol from each of multiple transmit antennas using the same N data and pilot subcarriers. For example, if a MIMO-OFDM system uses three transmit antennas, then, for a given symbol period and value for N, the MIMO-OFDM system may transmit data at approximately three times the rate at which an OFDM system may transmit data, and may do this using approximately the same bandwidth! And even though the MIMO-OFDM symbols include the same subcarrier-frequencies, a phenomenon called "spatial diversity" may allow the receiver to recover all of the transmitted symbols with an error rate that is suitable for many applications.

Figure 11:
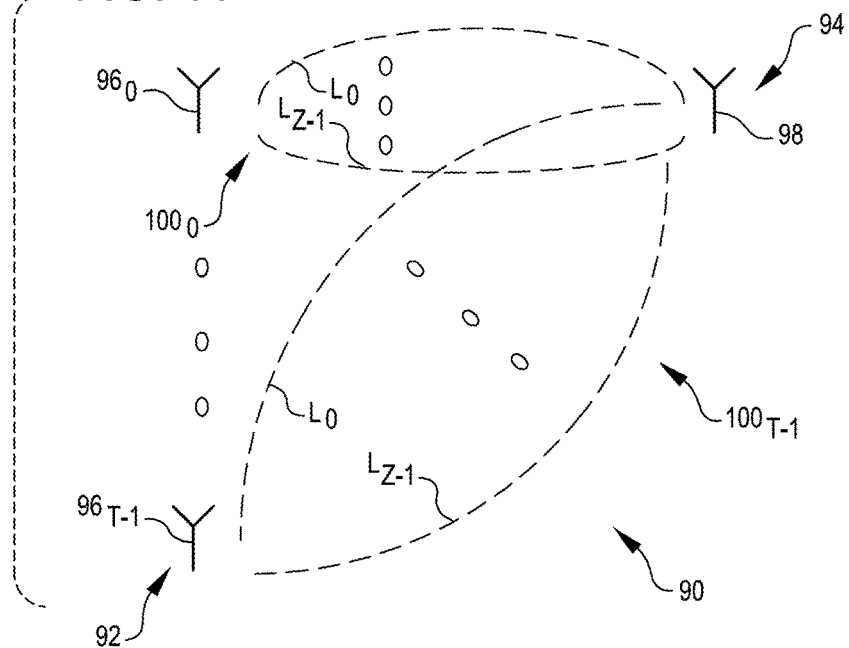
FIG. 11 is a diagram of an embodiment of base and client MIMO-OFDM transmitter-receivers that are moving relative to one another while they are communicating with one another, and of the communication paths between multiple base transmit antennas and a single client receive antenna.

FIG. 11 is a diagram of a MIMO-OFDM system 90, which includes a base transmitter-receiver 92 and a client transmitter-receiver 94; the diagram is simplified to include only the antennas 96 and 98 of the base and client, respectively. Furthermore, only the configuration/operation of the system 90 where the base 92 is the transmitter and the client 94 is the receiver is discussed, it being understood that the configuration/operation of the system where the client is the transmitter and the base is the receiver may be similar. Moreover, in the described configuration of the system 90, although the client 94 may include more than one antenna 98, it uses only one antenna for receiving signals from the base 92. In addition, the base 92 and client 94 may be moving relative to one another such that signals propagating between the base and client may experience Doppler Spread.

The base 92 includes T antennas $96_0$-$96_{T-1}$, and, in a transmitting configuration, transmits a respective OFDM signal carrying a respective OFDM symbol via each of these T antennas during a symbol period s, where, as discussed above, each OFDM signal includes the same N subcarriers. The combination of these simultaneous T OFDM signals may be referred to as a MIMO-OFDM signal. Furthermore, the base 92 may include a respective transmitter for each antenna 96, or may include fewer than T transmitters, at least some of which drive multiple ones of the antennas 96.

Therefore, in the described configuration, the system 90 forms T multipath transmit channels $100_0$-$100_{T-1}$ between the respective transmit antennas $96_0$-$96_{T-1}$ and the receive antenna 98. That is, the system 90 forms a respective channel 100 between each transmit antenna $96_0$-$96_{T-1}$ and the single receive antenna 98. Furthermore, in an embodiment, the system 90 "assumes" that each channel 100 has the same number Z of paths L.

Consequently, for a given symbol period s and number N of subcarriers, the MIMO-OFDM system 90 may transmit data at rate that is approximately T times the rate at which an OFDM system transmits data.

Because the channels 100 each include different paths L, the channels may be said to be spatially different or diverse. As discussed above and as evident from the equations discussed below in conjunction with FIG. 14, even though the base 92 transmits the T OFDM signals using the same N subcarriers, the spatial diversity of the channels 100 allows the client 94 to recover each of the transmitted symbols with an error rate that may be suitable for many applications, for example, mobile applications where Doppler Spread may be present.

Figure 12:
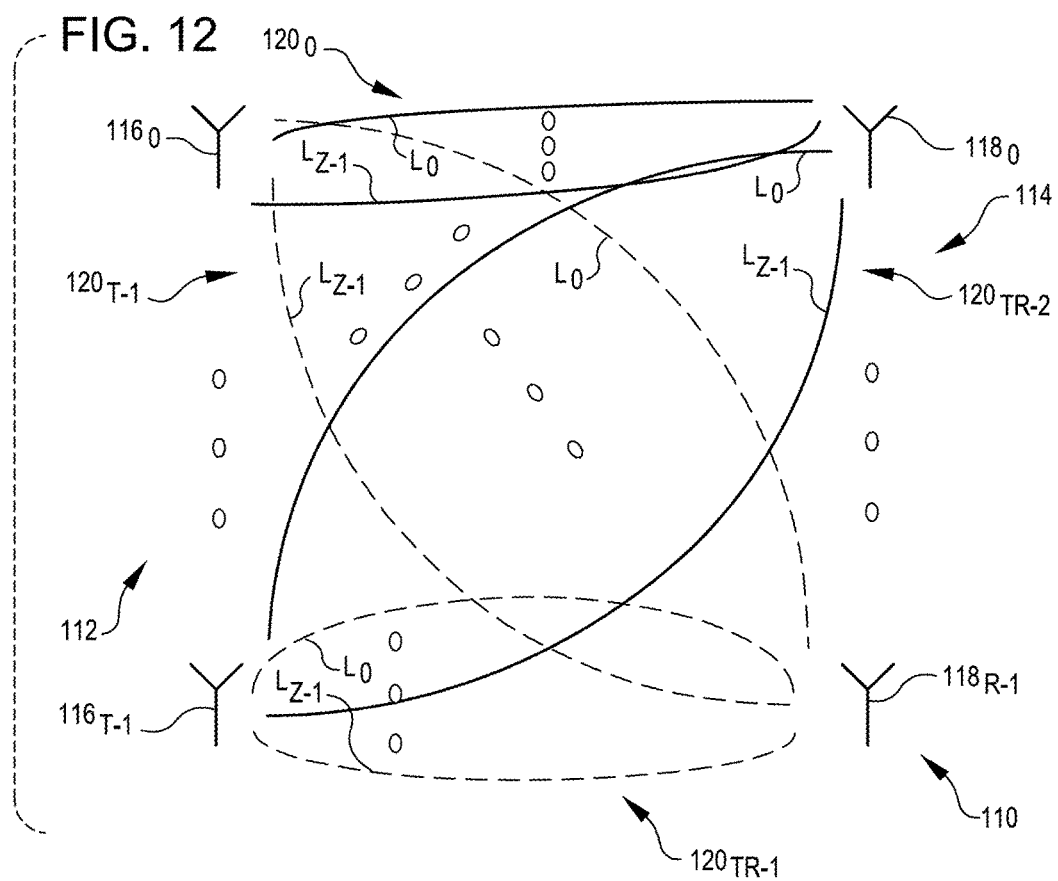
FIG. 12 is a diagram of an embodiment of base and client MIMO-OFDM transmitter-receivers that are moving relative to one another while they are communicating with one another, and of the communication paths between multiple base transmit antennas and multiple client receive antennas.

FIG. 12 is a diagram of a MIMO-OFDM system 110, which includes a base transmitter-receiver 112 and a client transmitter-receiver 114; the diagram is simplified to include only the antennas 116 and 118 of the base and client, respectively. Furthermore, only the configuration of the system 110 where the base 112 is the transmitter and the client 114 is the receiver is discussed, it being understood that the configuration of the system where the client is the transmitter and the base is the receiver may be similar. In addition, the base 112 and client 114 may be moving relative to each other such that signals propagating between the base and client may experience Doppler Spread.

A difference between the MIMO-OFDM system 110 and the MIMO-OFDM system 90 of FIG. 11 is that in the system 110, the client 114 includes and uses R>1 antennas 118 to receive the OFDM signals that the base 112 respectively transmits via the T transmit antennas 116; consequently, the system 110 forms T×R channels 120. In an embodiment of the system 110, R≥T-1.

Although the multiple receive antennas R may not increase the data rate, they may increase the robustness of the system 110. For example, although each receive antenna 118 receives the same T OFDM signals from the transmit antennas 116, each receive antenna receives these T signals over channels that are spatially diverse relative the channels over which the other receive antennas receive these signals. Therefore, although the OFDM signals received by one receive antenna 118 may carry OFDM symbols that are redundant relative to the OFDM symbols carried by the OFDM signals received by the other receive antennas, the spatial diversity of the channels over which the receive antennas receive this redundant information may decrease the data error rate because the client 114 has more diverse channels and paths from which to recover the T OFDM symbols. Furthermore, if one or more of the channels 120 between the transmit antennas 116 and one of the receive antennas 118 experiences catastrophic fading or other interference at a frequency of one or more of the N subcarriers, then the client 114 may still be able to recover the T transmitted OFDM symbols via one or more of the other receive antennas that receive the T OFDM signals over uncorrupted channels.

Figure 13:
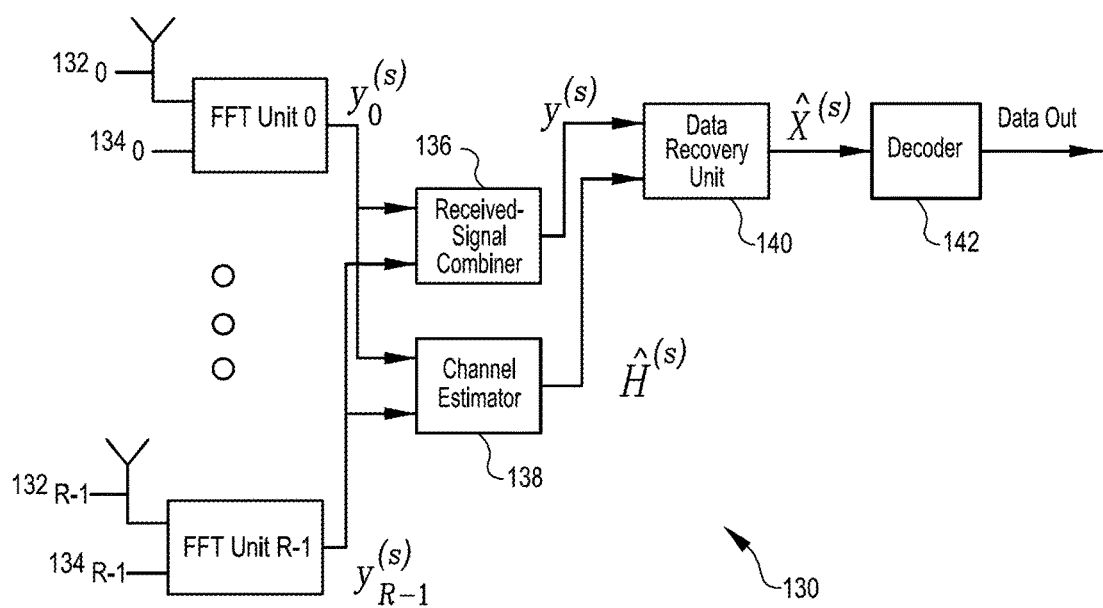
FIG. 13 is a block diagram of an embodiment of the receiver of one or both of the base and client transmitter-receivers of FIGS. 11 and 12.

FIG. 13 is a block diagram of an embodiment of a receiver 130 for a mobile MIMO-OFDM device such as the base 92 or client 94 of FIG. 11, and such as the base 112 or client 114 of FIG. 12.

The receiver 130 includes R receive antennas $132_0$-$132_{R-1}$, R FFT units $134_0$-$134_{R-1}$, a received-signal combiner 136, a channel estimator 138, a data-recovery unit 140, and a decoder 142. The FFT units 134, combiner 136, channel estimator 138, data-recovery unit 140, and decoder 142 may each be implemented in software, hardware, or a combination of software and hardware. For example, one or more of these items may be implemented on an integrated circuit (IC), and other components, such as a transmitter, may also be implemented on the same IC, either on a same or different IC die. And this IC may be combined with one or more other ICs (not shown in FIG. 13) to form a system such as the MIMO-OFDM system 90 of FIG. 11 or the MIMO-OFDM system 110 of FIG. 12. Alternatively, the functions of one or more of these components may be performed by a controller, such as a processor, executing software instructions.

Each of the receive antennas 132 may receive OFDM singles from multiple transmit antennas, such as the T transmit antennas 96 of FIG. 11 or the T transmit antennas 116 of FIG. 12, where at least some of the N subcarrier signals may experience Doppler Spread. The receive antennas 132 may also function to transmit collectively a MIMO-OFDM signal generated by a transmitter (not shown in FIG. 13) of the MIMO-OFDM device that incorporates the receiver 130. That is, the antennas 132 may function to both receive and transmit MIMO-OFDM signals.

Each of the FFT units $134_0$-$134_{R-1}$ conventionally converts a respective received MIMO-OFDM signal from a respective time-domain waveform into a respective N×1 column vector $y_0^{(s)}$-$y_{R-1}^{(s)}$ of complex frequency-domain coefficients (e.g., one complex coefficient for each subcarrier).

The combiner 136 combines the vectors $y_0^{(s)}$-$y_{R-1}^{(s)}$ into a single vector $y^{(s)}$. But if the device 130 has only R=1 receive antennas 132, then the combiner 136 may be omitted, and the output of the single FFT unit $134_0$ may be coupled to the $y^{(s)}$ input of the data-recovery unit 140. An embodiment of the combiner 136 is discussed below in conjunction with FIG. 16.

The channel estimator 138 estimates the responses of all of the communication channels (e.g., the channels $100_0$-$100_{T-1}$ of FIG. 11 or the channels $120_0$-$120_{TR-1}$ of FIG. 12) from the coefficients of the vectors $y_0^{(s)}$-$y_{R-1}^{(s)}$ corresponding to the pilot subcarriers, which, as discussed above in conjunction with FIGS. 5-8, are the subcarriers that compose the training portion of the received MIMO-OFDM symbol. From these pilot-subcarrier coefficients, the estimator 138 generates an N×NR matrix $\hat{H}^{(s)}$ of complex frequency coefficients that collectively approximate the effective frequency response $H^{(s)}$ of all the communication channels combined—the effective frequency response may take into account the affect of, e.g., channel conditions such as temperature and humidity and the Doppler Spread at each of the subcarrier frequencies $f_k$ in each of the channels, and the existence of multiple transmission paths per channel. Because, as discussed above in conjunction with FIGS. 3-8, the Doppler Spread may cause energy from one subcarrier to spill over into the frequency slot of another subcarrier at the receiver 130, the matrix $\hat{H}^{(s)}$ may not be a diagonal matrix—a matrix is diagonal if all of its elements are zero except for the elements that lie along the main diagonal that extends from the top left corner of the matrix. An embodiment of the channel estimator 138, and an embodiment of a technique for generating the channel-estimation matrix $\hat{H}^{(s)}$, are discussed below in conjunction with FIGS. 14-15.

The data-recovery unit 140 recovers the data carried by the MIMO-OFDM symbol as transmitted by generating a TN×1 column vector $\hat{x}^{(s)}$, which is an estimation of the transmitted MIMO-OFDM symbol, which is equivalent to T OFDM symbols. That is, $\hat{x}^{(s)}$ includes complex coefficients (one for at least each data subcarrier) that are estimates of the complex coefficients with which the transmitter(s) modulated the transmitted subcarriers. The unit 140 may generally recover $\hat{x}^{(s)}$ according to equations (1) and (2) above. Because, as discussed above in conjunction with FIGS. 3-8, some of the $y^{(s)}$ coefficients are for pilot subcarriers that are used only for channel-estimation purposes, the elements of $\hat{H}^{(s)}$, $\hat{x}^{(s)}$, $y^{(s)}$, and $n^{(s)}$ that correspond to the $TN_p L_{PN}$ pilot subcarriers (where $TN_p$ is the number of pilot clusters $L_p$ in the MIMO-OFDM symbol, and $L_{PN}$ is the number of pilot subcarriers within each pilot cluster $L_p$) may be discarded prior to calculating $\hat{H}^{(s)-1}$ and solving equation (2) so as to reduce the complexity, and increase the speed, of the calculation of $\hat{x}^{(s)}$. Examples of a data-recovery unit 140 and data-recovery techniques that may be used as and by the data-recovery unit are disclosed in U.S. patent application Ser. Nos. 12/579,935 and 12/579,969, which were filed on Oct. 15, 2009 and which are incorporated by reference. And conventional data-recovery units and techniques that may be respectively used as and by the data-recovery unit 140 also exist.

The data decoder 142 effectively uses the $\hat{x}^{(s)}$ coefficients that correspond to the data subcarriers of the MIMO-OFDM symbol to demodulate the corresponding data subsymbols, and to thus recover the data represented by the subsymbols. For example, if a transmitter modulated a data subcarrier by mapping it to a respective QPSK constellation element, then the data decoder 142 QPSK demodulates the data subcarrier to recover the same constellation element, which represents the bits of data carried by the modulated data subcarrier.

Still referring to FIG. 13, although conventional MIMO-OFDM channel estimators exist, such a channel estimator may require a relatively long processing time to determine $\hat{H}^{(s)}$. For example, a significant portion of the processing time consumed by a conventional channel estimator may be due to the calculating of one or more inverted matrices in real time as part of the algorithm for determining $\hat{H}^{(s)}$.

And referring to FIGS. 11, 12, and 13, and as discussed above in conjunction with FIG. 9, a conventional channel estimator may also be unable to account for changes in the number of the paths L that compose the communication channels 100 or 120, for changes in the respective delays of these paths, and for changes in the respective portions of the MIMO-OFDM signal energy carried by these paths.

Unfortunately, a channel estimator that does not account for changes in at least one of the number, delays, and energies of the paths L may be unable to determine the channel-estimation matrix $\hat{H}^{(s)}$ with an accuracy sufficient for some applications such as mobile MIMO-OFDM.

Figure 14:
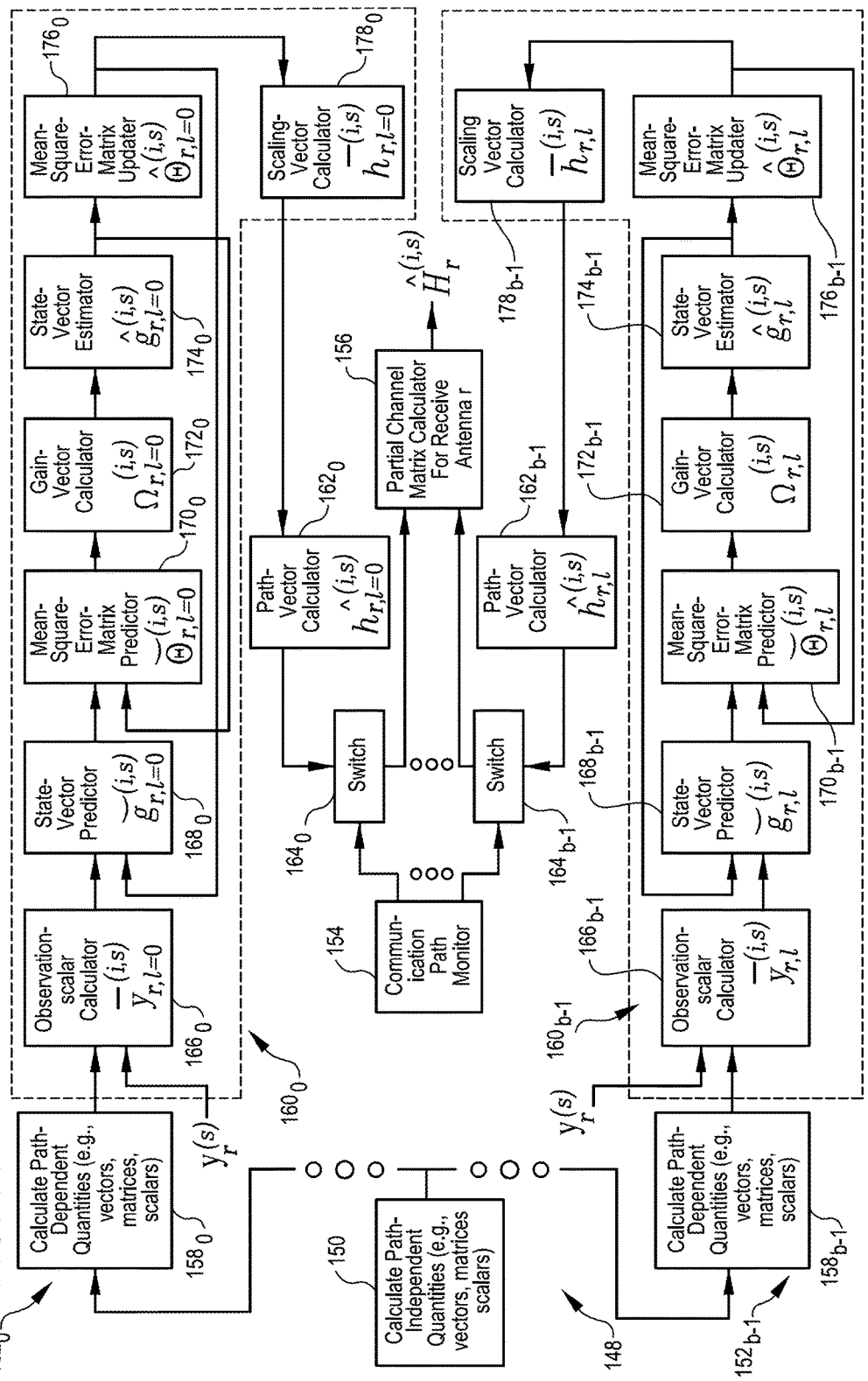
FIG. 14 is a block diagram of an embodiment of a portion of the channel estimator of FIG. 13, the portion associated with a single receive antenna.

FIG. 14 is a block diagram of an embodiment of a portion 148 of the channel estimator 138 of FIG. 13 corresponding to one transmit antenna and one receive antenna (e.g., receive antenna $132_{R-1}$ of FIG. 13) where i is the transmit-antenna index, r is the receive-antenna index, and the channel estimator may determine the partial channel-estimation matrices $\hat{H}_r^{(i,s)}$: (1) recursively without calculating the inverse of a matrix at least in real time, and (2) by accounting for changes in the number, delays, and/or energies of the paths L that compose the communication channels corresponding to the receive antenna. It is contemplated that the portions 148 of the channel estimator 138 corresponding to the other transmit antennas T and to the other receive antennas 132 (if there is more than one receive antenna) may be similar.

The portion 148 of the channel estimator 138 determines the partial channel-estimation matrix $\hat{H}_r^{(i,s)}$ for the communication channel between the $i^{th}$ transmit antenna (e.g., a transmit antenna 116 in FIG. 12) and the $r^{th}$ receive antenna (e.g., a receive antenna 132 in FIG. 13); therefore, for T transmit antennas and R receive antennas, the channel estimator 138 includes R×T portions that may be similar to the portion 148. For example, if R=T=2, then the channel estimator 138 may include 2×2=4 respective portions 148 for the following channels: (i=0, r=0), (i=1, r=0), (i=0, r=1), and (i=1, r=1). An embodiment of a combiner for combining the R×T partial channel-estimation matrices $\hat{H}_r^{(i,s)}$ into a channel-estimation matrix $\hat{H}^{(s)}$ is described below in conjunction with FIG. 15.

The partial channel-estimator portion 148 includes a first stage 150 for determining path-independent quantities for the communication channel between the $i^{th}$ transmit antenna and $r^{th}$ receive antenna (hereinafter the (r,i) channel), b parallel second stages $152_0$-$152_{b-1}$ for respectively determining column vectors $h_{r,l}^{(i,s)}$ that describe the time-domain responses of the Z paths L of the (r,i) channel during the symbol period s, a communication-path monitor 154 for monitoring the number and delays of the Z channel paths L, and a partial channel-matrix calculator 156 for determining the partial channel-estimation matrix $\hat{H}_r^{(i,s)}$ for the (r,i) channel during the symbol period s.

The first stage 150 determines quantities that are related to the (r,i) channel but that are independent of any particular channel path L, and that may be used by the second and third stages 152 and 156. Examples of, and techniques for determining, such quantities are discussed below. Furthermore, if such a quantity is also independent of either the receive antenna r or the transmit antenna i, then the first stage 150 may provide such quantity to one or more first stages of the other channel-estimator portions 148, or receive such quantity from a first stage of another channel-estimator portion, to reduce or eliminate redundant processing.

Each of the second stages 152 determines a respective time-domain path vector $h_{r,l}^{(i,s)}$ for a respective one of the Z paths $L_0 \le l \le L_{z-1}$. The number b of second stages 152 depends on the path delays that the (r,i) channel may possibly have for a particular application. For example, suppose that even though it is anticipated that the (r,i) channel will not have more than Z=4 simultaneous paths L during a symbol period s, the delays of these paths may range from 0 to 4 samples in increments of 0.25 samples, for a total of 4×1/(0.25)=16 possible path delays. Therefore, in such an example, the partial-channel-estimator portion 148 would include b=16 second stages $152_0$-$152_{15}$, one stage for each of the anticipated sixteen path delays, respectively. As discussed below, the path monitor 154 engages the second stages 152 corresponding to the delays of the paths L present in the (r,i) channel.

Each second stage 152 includes a first substage 158, a second substage 160, a third substage 162, and an engage/disengage switch 164.

Each first substage 158 is for determining quantities that are dependent on the particular channel path L of the (r,i) channel associated with the second stage, and that may be used by the corresponding second substage 160. Examples of, and techniques for calculating, such quantities are discussed below. Furthermore, if such a path-dependent quantity is independent of the receive antenna r or transmit antenna i, then the first substage 158 may provide such quantity to one or more first substages of the other channel-estimator portions 148, or receive such quantity from a first substage of another channel-estimator portion, to reduce or eliminate redundant processing.

Each second substage 160 may include a respective recursive filter, such as a Vector State Scalar Observation (VSSO) Kalman filter, which may increase the accuracy of the respective determined vector $h_{r,l}^{(i,s)}$ without increasing the complexity (or even reducing the complexity) of the channel estimator 138 as compared to prior channel estimators. The recursive-filter substage 160 may increase the accuracy of $h_{r,l}^{(i,s)}$ by effectively using information from preceding symbol periods to determine $h_{r,l}^{(i,s)}$ for a current symbol period s. For example, referring to FIG. 12, suppose that the client 114 is moving at an approximately constant velocity relative to the base 112; therefore, from symbol period to symbol period, one would expect the Doppler Spread to be approximately the same. Without the recursive-filter substage 160, the second stage 152 may allow an anomaly, such as a noise "spike," during a symbol period s to introduce a significant error into the path vector $h_{r,l}^{(i,s)}$, because the second stage has no way to "know" that the Doppler Spread is approximately constant relative to prior symbol periods. But because the recursive-filter substage 160 may track the trend (e.g., approximately constant Doppler Spread) of the response of the path L, it may allow the second stage 152 to lessen, or even eliminate, the error that an anomaly may introduce into $h_{r,l}^{(i,s)}$. Furthermore, one may design the recursive-filter stage 160 such that it does not perform a matrix inversion, at least not in real time; for example, a VSSO Kalman filter does not perform a matrix inversion in real time. This may reduce the complexity of each second stage 152, and thus may reduce the overall complexity of the channel estimator 138 as compared to conventional channel estimators. An embodiment of a recursive-filter substage 160 is described below.

Each third substage 162 determines the respective path vector $h_{r,l}^{(i,s)}$ in response to the second substage 160 as described below.

The communication-path monitor 154 tracks changes to the number, delays, and energies of the communication paths L in the (r,i) channel, and periodically adjusts which of the second stages 152 are engaged and disengaged based on the delays and numbers of paths L that are currently present in the channel. For example, if the path monitor 154 determines that the (r,i) channel currently has Z=4 active paths L having relative delays of 0.0 (the zero-delay path typically is always present), 0.25, 1.25, and 2.0 respectively, then the path monitor engages the second stages 152 corresponding to these delays via the respective switches 164, and disengages the remaining second stages via respective switches 164. The path monitor 154 determines which paths are active (i.e., present for purposes of the receiver 130 of FIG. 13) by monitoring the energies of the paths and comparing the energies to a path threshold. If a path's energy is greater than the threshold, then the corresponding path is active/present; otherwise, the corresponding path is inactive/not present. An embodiment of the path monitor 154 is further described in U.S. patent application Ser. No. 12/963,569, which is incorporated by reference.

The third stage 156 generates the partial channel-estimation matrix $\hat{H}_r^{(i,s)}$ in response to the path vectors $h_{r,l}^{(i,s)}$ from the second stages 152 that the communication-path monitor 154 engages.

An embodiment of the second recursive-filter substage $160_0$ of the second stage $152_0$ is now described where the substage $160_0$ includes a VSSO Kalman filter, it being understood that the second substages $160_1$-$160_{b-1}$ may be similar.

The VSSO-Kalman-filter substage $160_0$ includes an observation scalar calculator $166_0$, a state-vector predictor $168_0$, a mean-square-error-matrix predictor $170_0$, a gain-vector calculator $172_0$, a state-vector estimator $174_0$, a mean-square-error-matrix updater $176_0$, and a scaling-vector calculator $178_0$; these components are described below.

Before describing the operation of an embodiment of the partial channel-estimator portion 148 of FIG. 14, some MIMO-OFDM channel-estimation-related quantities, and the mathematical relationships between some of these quantities, are described. All of the quantities and relationships described below assume that: (1) APPC pilot clusters $L_p$ (FIG. 8) are used unless otherwise noted (an embodiment of a pilot-symbol pattern that is compatible with the channel estimator 138 (FIG. 13) is discussed below in conjunction with FIG. 17); (2) the pilot clusters $L_p$ in each OFDM signal from a respective transmit antenna are in the same relative positions (i.e., include the same subcarriers); and (3) each of the R×T channels includes the same number Z of paths L.

$$h_{r,l}^{(i,s)}=[h_{r,l}^{(i,s)}(s), \ldots, h_{r,l}^{(i,s)}(s+N-1)]^T \quad (23)$$

where $h_{r,l}^{(i,s)}$ is the column vector that represents the time-domain response of the path l of the (r,i) channel during the $S^{th}$ MIMO-OFDM symbol period, $\underline{s}$ is the first sample time after the cyclic prefix in the $s^{th}$ OFDM symbol (if there is a cyclic prefix), and N is the number of subcarriers k (both pilot and data subcarriers) in the OFDM signal transmitted by the $i^{th}$ transmit antenna. For example, if N=128, s=1 (the symbol period after the $0^{th}$ symbol period) and the cyclic prefix has four samples, then the OFDM signal transmitted by the $i^{th}$ transmit antenna has a total of 128+4=132 samples, $\underline{s}$ represents the 268 sample time, and $h_{r,l}^{(i,s)}$ includes one hundred twenty eight complex elements corresponding to the samples 268-395.

In at least some applications, the elements of $h_{r,l}^{(i,s)}$ may be approximated as fitting a curve such as a straight line. Therefore, the elements of $h_{r,l}^{(i,s)}$ may be represented in terms of a polynomial that describes the curve. For example, where the curve is a straight line, which one may represent with the equation y=mx+b where m is the slope of the line and b is the y-axis intercept, $h_{r,l}^{(i,s)}$ may be similarly represented in terms of an offset and slope according to the following equation:

$$h_{r,l}^{(i,s)}=B\bar{h}_{r,l}^{(i,s)} \quad (24)$$

where B is a binomial expansion matrix having elements (m, n) arranged in Q columns such that $B(m,n)=m^n$ (m is the row number and n is the column number), and $\bar{h}_{r,l}^{(i,s)}$ is a scaling column vector having Q rows/elements; consequently, where the fitting curve is a straight line, $$B = \begin{bmatrix} 1 & 0 \\ \vdots & \vdots \\ 1 & N-1 \end{bmatrix}$$

and $\bar{h}_{r,l}^{(i,s)}$ is a column vector with Q=2 elements that respectively represent offset and slope. Because typically Q<<N, $\bar{h}_{r,l}^{(i,s)}$ is typically much smaller (e.g., has many fewer elements), and is thus easier to manipulate, than $h_{r,l}^{(i,s)}$.

The state vector $g_{r,l}^{(i,s)}$ for the engaged filter substage 160 corresponding to the $l^{th}$ path of the (r,i) channel during the symbol period s is given by the following equation:

$$g_{r,l}^{(i,s)}=[\bar{h}_{r,l}^{(i,s-M+1)T}, \ldots, \bar{h}_{r,l}^{(i,s)T}]^T \quad (25)$$

M, an integer, is the filter prediction order that provides a filter substage 160 with its recursive feature. For example, to design a filter substage 160 for calculating the state vector $g_{r,l}^{(i,s)}$ using information from the current symbol period and the previous three symbol periods, a designer would set M=4. Generally, the higher the prediction order M, the more accurate the filter substage 160 but the longer its latency, and the lower the value of M, the less accurate the filter substage but the shorter its latency.

The state equation for the engaged filter substage 160 corresponding to the $l^{th}$ path of the (r,i) channel relates the $l^{th}$ path during the current symbol period s to the same $l^{th}$ path during one or more prior symbol periods, and is as follows:

$$g_{r,l}^{(i,s)}=Ag_{r,l}^{(i,s-1)}+e_{r,l}^{(i,s)} \quad (26)$$

where A is an autoregressive matrix and e is the prediction-error vector. A is dependent on the Doppler Spread, and, therefore, the first stage 150 may determine values of A ahead of time in a conventional manner and store these values in a lookup table, which the first stage may access based on the velocity of the receiver relative to the transmitter; for example, a receiver such as the receiver 130 (FIG. 13) may determine this velocity using a GPS device. Alternatively, the channel estimator 138 may include a conventional linear-adaptive filter (not shown in FIG. 14) that conventionally looks at the pilot symbols recovered by the receiver for one or more prior symbol periods, predicts the pilot symbols to be recovered for the current symbol period s based on the current velocity of the receiver relative to the transmitter, and predicts the value of the A matrix based on the previously recovered pilot symbols and the predicted pilot symbols.

The prediction-error-correlation matrix $G_{r,l}^{(i,s)}$ is given by the following equation:

$$G_{r,l}^{(i,s)}=E\{e_{r,l}^{(i,s)}e_{r,l}^{(i,s)H}\} \quad (27)$$

Although the vector $e_{r,l}^{(i,s)}$ may be unknown, its expectation (the right side of equation (27)), which may be generally described as an average of the change in the variance of $e_{r,l}^{(i,s)}$ from symbol period to symbol period, depends on the Doppler Spread, and, therefore, may be conventionally determined ahead of time through simulations or with a closed-form expression. Furthermore, because this expectation is approximated to be the same from symbol period to symbol period, the left side of equation (27) is independent of the symbol period s. Consequently, the first substage 158 may determine values for $G_{r,l}^{(i)}$ dynamically or ahead of time and/or store these values of $G_{r,l}^{(i)}$ in a lookup table with respect to Doppler Spread, and may retrieve from the lookup table a value of $G_{r,l}^{(i)}$ for the current symbol period based on the velocity of the receiver relative to the transmitter during the current symbol period.

A channel-independent $N_p \times 1$ column vector $P_p^a$, which the first substage 158 may calculate and/or store dynamically or ahead of time, is given by the following equation:

$$P_p^a=[P_b+a, P_b+P_{sep}+a, \ldots, P_b+(N_p-1)P_{sep}+a] \quad (28)$$

where, as discussed above in conjunction with FIGS. 7-8, $P_b$ is the relative center pilot subcarrier of each pilot cluster $L_p$ (and, therefore, is the center pilot subcarrier of the first pilot cluster $L_p$), $P_{sep}$ is the pilot-cluster separation, and $N_p$ is the number of pilot clusters in an OFDM signal transmitted by each transmit antenna. For example, if a signal has $N_p=3$ pilot clusters of $L_{PN}=5$ pilot subcarriers each, $P_b=2$, and $P_{sep}=8$, then $P_p^{-2}=[0, 8, 16]$, $P_p^{-1}=[1, 9, 17]$, $P_p^0=[2, 10, 18]$, $P_p^{+1}=[3, 11, 19]$, and $P_p^{+2}=[4, 12, 20]$.

A transmit-antenna-dependent $1 \times L_p$ row vector $P_{cluster}^{(i,c)}$, which the first substage 158 may store ahead of time, is defined as the $c^{th}$ pilot cluster $L_p$ transmitted by the $i^{th}$ transmit antenna. For example, where c=0, then the elements of $P_{cluster}^{(i,0)}$ include the pilot symbols of the $0^{th}$ pilot cluster $L_p$ transmitted by the $i^{th}$ transmit antenna. The first substage 158 may generate and/or store the vectors $P_{cluster}^{(i,c)}$ because the receiver 130 (FIG. 13) "knows" the pilot symbols and pilot-cluster locations ahead of time.

A transmit-antenna-dependent value $P^{(i,k)}$, which the first substage 158 may store ahead of time, is the pilot symbol (e.g., in the frequency domain) transmitted from the $i^{th}$ antenna on the $k^{th}$ subcarrier.

A transmit-antenna-dependent pilot-pattern matrix $P_{pat}^{(i)}$ of dimensions $N_p \times L_{PN}$, which the first substage 158 may determine and/or store ahead of time, is given by the following equation:

$$P_{pat}^{(i)} = \begin{bmatrix} P_{cluster}^{(i,0)} \\ \vdots \\ P_{cluster}^{(i,N_p-1)} \end{bmatrix} \quad (29)$$

where, the first row of $P_{pat}^{(i)}$ includes the pilot symbols that compose the $0^{th}$ pilot cluster $L_p$ transmitted from the $i^{th}$ transmit antenna, the second row of $P_{pat}^{(i)}$ includes the pilot symbols that compose the $1^{st}$ pilot cluster $L_p$ transmitted from the $i^{th}$ transmit antenna, and the $(N_p-1)^{th}$ row of $P_{pat}^{(i)}$ includes the pilot symbols that compose the $(Np-1)^{th}$ pilot cluster $L_p$ transmitted from the $i^{th}$ transmit antenna. In an embodiment, the rows of $P_{pat}^{(i)}$ may be shifted up or down as long as they remain in a sequence $0$-$N_p$-$1$ and the same shift is applied to all of the matrices $P_{pat}^{(i)}$ for $0 \le i \le T-1$ (where T is the number of transmit antennas).

A channel-independent matrix Q (not to be confused with the value Q described above) having the same dimensions $N_p \times L_{PN}$ as $P_{pat}^{(i)}$ and which may be stored by the first substage 158 ahead of time, is given by the following equation:

$$Q = \begin{bmatrix} P_b - w_p & \cdots & P_b + w_p \\ & \vdots & \\ P_b + P_{sep}(N_p-1) - w_p & \cdots & P_b + P_{sep}(N_p-1) + w_p \end{bmatrix} \quad (30)$$

That is, the matrix Q includes the subcarrier indices k for the pilot symbols in $P_{pat}^{(i)}$. For example, if a transmitted signal has $N_p=3$ pilot clusters of $L_{PN}=5$ pilot subcarriers each, $P_b=2$, and $P_{sep}=8$, then Q would equal $$\begin{bmatrix} 0 & 1 & 2 & 3 & 4 \\ 8 & 9 & 10 & 11 & 12 \\ 16 & 17 & 18 & 19 & 20 \end{bmatrix}.$$

A channel-independent (assuming all pilot clusters are in the same relative positions in all i transmitted OFDM signals) column vector $P_Q$ having dimensions $N_p L_{PN} \times 1$ and which the first substage 158 may determine and/or store ahead of time, is given by the following equation:

$$P_Q = [k_{P_b-w_p} \ldots k_{P_b+P_{sep}(N_p-1)+w_p}]^T \quad (31)$$

That is, $P_Q$ includes the subcarrier indices k of all pilot subcarriers in an OFDM symbol; or, viewed another way, $P_Q$ includes the rows of the matrix Q transposed and "stacked" end to end.

A transmit-antenna- and path-dependent $2N_p \times L_{PN}$ matrix $\underline{\theta}_l^{(i)}$, which the first substage 158 may determine and/or store ahead of time, is given by the following equation:

$$\underline{\theta}_l^{(i)} = \begin{bmatrix} e^{-j2\pi Q \Delta fl} & \odot & p_{pat}^{(i)} \\ e^{-j2\pi Q \Delta fl} & \odot & p_{pat}^{(i)} \end{bmatrix} \quad (32)$$

where $$\Delta f = \frac{1}{N}$$

and the "$\odot$" operator indicates that each e term is formed using a respective element of the matrix Q, each formed e term is multiplied by a corresponding element of the matrix $p_{pat}^{(i)}$, and this procedure is repeated for all $N_p \times L_{PN}$ elements of Q and $p_{pat}^{(i)}$, resulting in another $N_p \times L_{PN}$ matrix. Then, this resulting matrix is effectively "stacked" on itself to obtain the $2N_p \times L_{PN}$ matrix $\underline{\theta}_l^{(i)}$.

$N_p$ transmit-antenna- and path-dependent $N_p \times L_{PN}$ matrices $R_l^{(i,u)}$, which the first substage 158 may determine and/or store ahead of time, are given by the following equation for $0 \le u \le N_p-1$:

$$R_l^{(i,u)} = \underline{\theta}_l^{(i)}(u \to u+Np-1,:) \quad (33)$$

where "$u \to u+Np-1$" are the rows of $\underline{\theta}_l^{(i)}$ used to populate $R_l^{(i,u)}$ and ":" indicates that all columns of these rows of $\underline{\theta}_l^{(i)}$ are used to populate $R_l^{(i,u)}$.

A transmit-antenna- and path-dependent $N_p \times N_p L_{PN}$ matrix $\theta_l^{(i)}$ (note there is no underline beneath "$\theta$", this lack of an underline distinguishing this matrix from the matrix $\underline{\theta}_l^{(i)}$ of equation (32)), which the first substage 158 may determine and/or store ahead of time, is given by the following equation:

$$\theta_l^{(i)} = [R_l^{(i,0)} R_l^{(i,1)} \ldots R_l^{(i,N_p-1)}] \quad (34)$$

j channel-independent $N_p L_{PN} \times N$ matrices $W^{(j)}$, which the first stage 150 may calculate and/or store dynamically or ahead of time, is given by the following equation for $-B_p \le j \le +B_p$:

$$W^{(j)} = \begin{bmatrix} F^H(\langle N + (P_Q(0) - P_b - j)\rangle, :) \\ F^H(\langle N + (P_Q(1) - P_b - j)\rangle, :) \\ \vdots \\ F^H(\langle N + (P_Q(N_p L_{PN}-1) - P_b - j)\rangle, :) \end{bmatrix} \quad (35)$$

where F is the known Fourier matrix, the "$\langle \; \rangle$" operator indicates a modulo N operation, $P_Q(n)$ is the $n^{th}$ element of the vector $P_Q$ (equation (31)), $P_b$ is the index of the relative center pilot subcarrier of each pilot cluster $L_p$ (and the center pilot subcarrier of the first pilot cluster), and ":" indicates all columns of the matrix $F^H$ in the indicated rows. Note that the number of rows in each $W^{(j)}$ matrix is equal to the number $N_p L_{PN}$ of pilot subcarriers in each transmitted OFDM signal.

A receive-antenna-dependent column vector $\bar{y}_r^{(s)}$ is given by the following equation for $-B_p \le a \le +B_p$:

$$\bar{y}_r^{(s)} = y_r^{(s)}(P_p^a) \quad (36)$$

where $y_r^{(s)}$ is the signal received by the $r^{th}$ receive antenna during the symbol period s, and "$(P_p^a)$" (equation (28)), which for $-B_p \le a \le +B_p$ equals $[P_p^{-Bp} \ldots P_p^{Bp}]$, indicates which elements of $y_r^{(s)}$ form $\bar{y}_r^{(s)}$. For example, if there are $N_p=2$ pilot clusters with $L_{PN}=5$ pilot subcarriers and three ($B_p=1$) non-guard pilot subcarriers located at subcarriers k=0 (guard), k=1, k=2, k=3, k=4 (guard), and k=8 (guard), k=9, k=10, k=11, k=12 (guard), then for $-1 \le a \le +1$ $\bar{y}_r^{(s)}$ would include the following pilot subcarriers of $y_r^{(s)}$ in the listed order: k=1, k=9, k=2, k=10, k=3, k=11.

A transmit-antenna- and path-dependent (but symbol-period-s independent) $N_p \times (2B_p+1)$ matrix $q_l^{(i)H}$, which the first substage 158 may calculate and/or store dynamically or ahead of time, is given by the following equation:

$$q_l^{(i)H} = [f^{(iL+l)H} \ldots f^{(iL+l)H}] \quad (37)$$

That is, $q_l^{(i)H}$ has $2B_p+1$ identical elements, and $f^{(iL+l)}$ is a $N_p \times 1$ row vector. Examples of $f^{(iL)}$ and $f^{(iL+l)}$ are described below in conjunction with FIG. 17. Using $q_l^{(i)H}$ of equation

(37) and generating pilot patterns according to the pilot-pattern matrix $p_{pat}^{(i)}$ of equation (54) allow the substages 160 to be VSSO-Kalman-filter substages.

A transmit-antenna- and path-dependent (but symbol-period-s independent) matrix $\emptyset_l^{(i)}$, which the first substage 158 may determine and/or store ahead of time, is given by the following equation:

$$\phi_l^{(i)} = \begin{bmatrix} \theta_l^{(i)} & 0 & \cdots & 0 \\ 0 & \theta_l^{(i)} & \cdots & 0 \\ \vdots & \vdots & \ddots & \vdots \\ 0 & 0 & \cdots & \theta_l^{(i)} \end{bmatrix} \begin{bmatrix} W^{(-B_P)}B \\ \vdots \\ W^{(+B_P)}B \end{bmatrix} \quad (38)$$

A transmit-antenna- and path-dependent (but symbol-period-s independent) row vector $\bar{q}_l^{(i)H}$ (note the bar to distinguish this vector from $q_l^{(i)H}$ of equation (37)), which the first substage 158 may determine and/or store ahead of time, is given by the following equation:

$$\bar{q}_l^{(i)H} = [0_{1 \times (M-1)Q} \, q_l^{(i)H} \emptyset_l^{(i)}] \quad (39)$$

where $0_{1 \times (M-1)Q}$ is a row vector having (M−1)Q columns/elements that are each equal to zero.

The observation scalar $\bar{y}_{r,l}^{(i,s)}$ for the engaged filter substage 160 corresponding to the $l^{th}$ path of the (r,i) channel is given by the following equation:

$$\bar{y}_{r,l}^{(i,s)} = q_l^{(i)H} \bar{y}_r^{(s)} \quad (40)$$

The measurement equation for the engaged filter substage 160 corresponding to the $l^{th}$ path of the (r,i) channel is given by the following equation:

$$\bar{y}_{r,l}^{(i,s)} = \bar{q}_l^{(i)H} g_{r,l}^{(i,s)} + \bar{n}_{r,l}^{(i,s)} \quad (41)$$

where $\bar{n}_{r,l}^{(i,s)}$ is the noise due to, e.g., interference on the pilot subcarriers of the (r,i) channel from the data subcarriers and Additive White Gaussian Noise (AWGN) on this same channel. Although $\bar{n}_{r,l}^{(i,s)}$ may be unknown ahead of time, the first substage 158 associated with the $l^{th}$ path of the (r,i) channel may compute its expectation/variance $\bar{\sigma}_{r,l}^{2(i)} = E\{|\bar{n}_{r,l}^{(i,s)}|^2\}$ dynamically or ahead of time by simulation or as a closed-form expression in a conventional manner.

Referring to equation (40) and as further discussed below, the measurement equation effectively relates the symbol recovered during the symbol period s to the response of the (r,i) channel during s, and, referring to equation (41) and also as further discussed below, the state equation (26), via the state vector $g_{r,l}^{(i,s)}$, effectively modifies the result $\bar{y}_{r,l}^{(i,s)}$ given by the measurement equation (40) on the response of the (r,i) channel during one or more prior symbol periods.

Furthermore, because $\bar{y}_{r,l}^{(i,s)}$ is a scalar, as discussed below, the filter substage 160 does not invert a matrix (at least not in real time), which may significantly reduce the overall complexity of the channel estimator 138 as compared to a conventional channel estimator.

Still referring to FIG. 14, the operation of an embodiment of the channel estimator 138 is described in terms of the second stage 152$_0$ of the partial channel-estimator portion 148, it being understood that the operations of the other second stages 152 may be similar. Furthermore, in an embodiment, at least one path $L_0$ having a relative delay of zero is always present in the (r,i) channel, and the second stage 152$_0$ is designed to determine $h_{r,l=0}^{(i,s)}$ for the $l=L_0=0$ path of the (r,i) channel having a relative delay of zero; therefore, in such an embodiment, the path monitor 154 always engages the second stage 152$_0$ for the path l=0 of the (r,i) channel having a relatively delay of zero. Moreover, in the example below, the elements of $h_{r,l}^{(i,s)}$ are fit to a straight line as described above.

First, the path monitor 154 determines the number Z and corresponding delays of the paths L that compose the (r,i) channel, and engages, via the switches 164, the second stages 152 that correspond to these paths. As discussed above, for purposes of the following example, it is assumed that the path monitor 154 has engaged at least the second stage 152$_0$.

Next, the first stage 150 may determine and/or store quantities (at least some of which are described above) that the second stage 152$_0$ may need for its calculations, to the extent that the first stage has not already determined and/or stored these quantities. Furthermore, if some of these quantities (e.g. $W^{(j)}$ are independent of the transmit and/or receive antenna, then the first stage 150 of this or another channel-estimator portion 148 may determine/store these quantities and provide them to the other first stages to reduce or eliminate redundant processing as discussed above.

Similarly, the first substage 158$_0$ may determine and/or store quantities (at least some of which are described above) that the filter substage 160$_0$ may need for its calculations, to the extent that the first substage has not already determined and/or stored these quantities. Furthermore, if some of these quantities are independent of the transmit and/or receive antenna, then the first substage 158$_0$ of this or another channel-estimation portion 148 may determine/store these quantities and provide them to the other first substages to reduce or eliminate redundant processing as discussed above.

Next, the observation-scalar calculator 166$_0$ determines the observation scalar $\bar{y}_{r,l}^{(i,s)}$ for l=0 of the (r,i) channel according to equation (40).

Then, the state-vector predictor 168$_0$ determines the predicted state vector $\check{g}_{r,l}^{(i,s)}$ for l=0 of the (r,i) channel according to the following equation:

$$\check{g}_{r,l}^{(i,s)} = A\hat{g}_{r,l}^{(i,s-1)} \quad (42)$$

Where s=0 (the initial symbol period), the predictor 168$_0$ also provides an initial value for $\hat{g}_{r,l}^{(i,\,-1)}$. This initial value may be zero, or it may be the expectation of $\hat{g}_{r,l}^{(i,\,-1)}$. If the initial value is the latter, then the predictor 168$_0$ may compute the expectation of $\hat{g}_{r,l}^{(i,\,-1)}$ dynamically or ahead of time and store the computed expectation. A technique for calculating the expectation of $\hat{g}_{r,l}^{(i,\,-1)}$ is described in S. M. Kay, "Fundamentals of Statistical Signal Processing: Estimation Theory," Prentice Hall: New Jersey (1993), which is incorporated by reference. After the initial symbol period s=0, the state-vector estimator 174$_0$ provides $\hat{g}_{r,l}^{(i,\,s)}$, which becomes $\hat{g}_{r,l}^{(i,\,s-1)}$ for the next symbol period s, as discussed below.

Next, the mean-square-error-matrix predictor 170$_0$ determines the predicted mean-square-error matrix $\check{\theta}_{r,l}^{(i,s)}$ for l=0 of the (r,i) path according to the following equation:

$$\check{\theta}_{r,l}^{(i,s)} = A\hat{\theta}_{r,l}^{(i,s-1)}A^H + G_{r,l}^{(i)} \quad (43)$$

Where s=0 (the initial symbol period), the predictor 170$_0$ also provides an initial value for $\hat{\theta}_{r,l}^{(i,\,-1)}$. This initial value may be zero, or it may be the expectation of the error variance in the state equation (26). If the initial value is the latter, then the predictor 170$_0$ may compute the expectation of the error variance in the state equation dynamically or ahead of time and store the computed expectation. A technique for calculating the expectation of the error variance in the state equation (26) is described in S. M. Kay, "Fundamentals of Statistical Signal Processing: Estimation Theory," Prentice Hall: New Jersey (1993), which is incorporated by reference. After the initial symbol period s=0, the mean-square-error-matrix updater $176_0$ provides $\hat{\theta}_{r,l}^{(i,s)}$, which becomes $\hat{\theta}_{r,l}^{(i,s-1)}$ for the next symbol period s, as discussed below.

Then, the gain-vector calculator $172_0$ determines a gain vector $\Omega_{r,l}^{(i,s)}$ for l=0 of the (r,i) channel according to the following equation:

$$\Omega_{r,l}^{(i,s)} = \frac{\bar{\theta}_{r,l}^{(i,s)} \bar{q}_l^{(i)}}{\bar{\sigma}_{r,l}^{2(i)} + \bar{q}_l^{(i)H} \bar{\theta}_{r,l}^{(i,s)} \bar{q}_l^{(i)}} \quad (44)$$

Next, the state-vector estimator $174_0$ generates the estimated state vector $\hat{g}_{r,l}^{(i,s)}$ for l=0 of the (r,i) channel according to the following equation:

$$\hat{g}_{r,l}^{(i,s)} = \check{g}_{r,l}^{(i,s)} + \Omega_{r,l}^{(i,s)} [\bar{y}_{r,l}^{(i,s)} - \bar{q}_l^{(i)H} \check{g}_{r,l}^{(i,s)}] \quad (45)$$

As discussed above, $\hat{g}_{r,l}^{(i,s)}$ is fed back to the state-vector predictor $168_0$ to be used in equation (42) as $\hat{g}_{r,l}^{(i,s-1)}$ for the next symbol period.

Then, the mean-square-error-matrix updater $176_0$ generates an updated mean-square-error matrix $\hat{\theta}_{r,l}^{(i,s)}$ for l=0 of the (r,i) channel according to the following equation:

$$\hat{\theta}_{r,l}^{(i,s)} = [I_{MQ} - \Omega_{r,l}^{(i,s)} \bar{q}_l^{(i)H}] \check{\theta}_{r,l}^{(i,s)} \quad (46)$$

where $I_{MQ}$ is an identity matrix of dimensions M(row)×Q (column) and "−" is a minus sign. Furthermore, as discussed above, $\hat{\theta}_{r,l}^{(i,s)}$ is fed back to the mean-square-error-matrix predictor $170_0$ to be used in equation (43) as $\hat{\theta}_{r,l}^{(i,s-1)}$ for the next symbol period.

Next, the scaling-vector calculator $178_0$ determines the scaling vector $\bar{h}_{r,l}^{(i,s)}$ for l=0 of the (r,i) channel for a straight-line approximation of the elements of $h_{r,l}^{(i,s)}$ according to one of the two following equations:

$$\bar{h}_{r,l}^{(i,s)} = \hat{g}_{r,l}^{(i,s)}(MQ-Q:MQ-1) \quad (47)$$

$$\bar{h}_{r,l}^{(i,s-M)} = \hat{g}_{r,l}^{(i,s)}(0:Q-1) \quad (48)$$

Equation (47) may be referred to as the normal Kalman filter (NKF) output, and equation (48) may be referred to as the Kalman fixed-lag smoother (KFLS) output, which is effectively a low-pass filtered output. Generally, the KFLS output is more accurate, but has a higher latency, than the NKF output.

Then, the third stage path-vector calculator $162_0$ determines the path vector $h_{r,l}^{(i,s)}$ for l=0 of the (r,i) channel according to equation (24) using either $\bar{h}_{r,l}^{(i,s)}$ from equation (47) or $\bar{h}_{r,l}^{(i,s-M)}$ from equation (48).

As stated above, the other engaged second stages 152 of the channel-estimator portion 148 may operate in a similar manner to generate $\bar{h}_{r,l}^{(i,s)}$ and $h_{r,l}^{(i,s)}$ for the paths l of the (r,i) channel to which they correspond. Typically, all engaged second stages 152 generate $\bar{h}_{r,l}^{(i,s)}$ according to equation (47) or equation (48) for a symbol period s, although it is contemplated that some second stages may generate $\bar{h}_{r,l}^{(i,s)}$ according to equation (47) while other second stages may generate $\bar{h}_{r,l}^{(i,s)}$ according to equation (48) for a same symbol period s.

Next, the third stage partial channel-matrix calculator 156 generates an intermediate partial-channel-estimation matrix $\underline{\hat{H}}_r^{(i,s)}$ from the path-response vectors $h_{r,l}^{(i,s)}$ for all of the paths 0≤l≤Z−1 that compose the (r,i) channel according to the following equation:

$$\underline{\hat{H}}_r^{(i,s)}(m,n) = \hat{h}_{r,(m-n)}^{(i,s)}(s+m), \text{ for } 0 \le m \le N-1 \text{ and } 0 \le n \le N-1 \quad (49)$$

Then, the third stage partial-channel-matrix calculator 156 generates the partial-channel-estimation matrix $\hat{H}_r^{(i,s)}$ for the (r,i) channel according to the following equation:

$$\hat{H}_r^{(i,s)} = \frac{1}{N} F \underline{\hat{H}}_r^{(i,s)} F^H \quad (50)$$

Still referring to FIG. 14, alternate embodiments of the channel estimator 138 and the partial channel-estimator portion 148 are contemplated. For example, alternate embodiments described above in conjunction with the channel estimator 36 of FIGS. 9 and 10 may be applicable to the channel estimator 138. Furthermore, the functions contributed to any of the components of the channel estimator 138 may be performed in hardware, software, or a combination of hardware and software, where the software is executed by a controller such as a processor. Moreover, although described as VSSO Kalman filters, one or more of the second substages 160 may be another type of recursive filter, for example, another type of recursive filter that does not invert a matrix, at least not in real time. In addition, although described as operating in response to APPC pilot clusters (FIG. 9), the channel estimator 138 may be modified (e.g., by modifying some or all of the above equations described in relation to FIGS. 11-14 according to known principles) to operate in response to FDKD pilot clusters (FIG. 8) or other types of pilot clusters. Furthermore, instead of, or in addition to, disengaging the unused second stages 152, the path monitor 154 may cause these unused second stages to enter a low- or no-power mode to save power.

Figure 15:
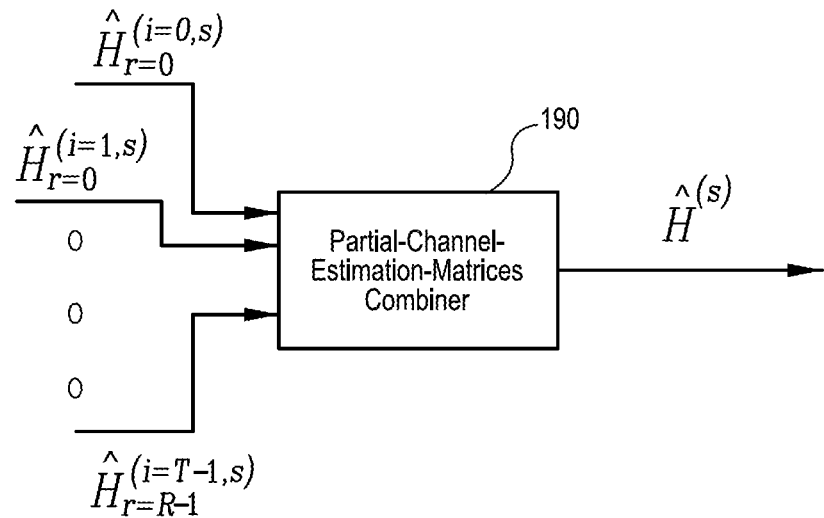
FIG. 15 is a block diagram of an embodiment of a partial-channel-estimation-matrix combiner of the channel estimator of FIG. 13.

FIG. 15 is a diagram of an embodiment of a partial-channel-estimation-matrices combiner 190 of the channel estimator 138 of FIG. 13.

The combiner 190 generates the RN×TN channel-estimation matrix $\hat{H}^{(s)}$ from the RT N×N partial channel-estimation matrices $\hat{H}_r^{(i,s)}$ (for 0≤i≤T−1 and 0≤r≤R−1) according to the following equation:

$$\hat{H}^{(s)} = [(\hat{H}_{r=0}^{(i=0,s)} \hat{H}_{r=0}^{(i=1,s)} \dots \hat{H}_{r=0}^{(i=T-1,s)}); \\ (\hat{H}_{r=1}^{(i=0,s)} \hat{H}_{r=1}^{(i=1,s)} \dots \hat{H}_{r=1}^{(i=T-1,s)}); \dots ; \\ (\hat{H}_{r=R-1}^{(i=0,s)} \hat{H}_{r=R-1}^{(i=1,s)} \dots \hat{H}_{r=R-1}^{(i=T-1,s)})]^T \quad (51)$$

such that one may think of $\hat{H}^{(s)}$ as a matrix that includes R T×N matrices stacked atop one another—note that the matrices within parenthesis (e.g., $\hat{H}_{r=0}^{(i=0,s)} \hat{H}_{r=0}^{(i=1,s)} \dots \hat{H}_{r=0}^{(i=T-1,s)}$) are not multiplied together, but are positioned next to one another.

Figure 16:
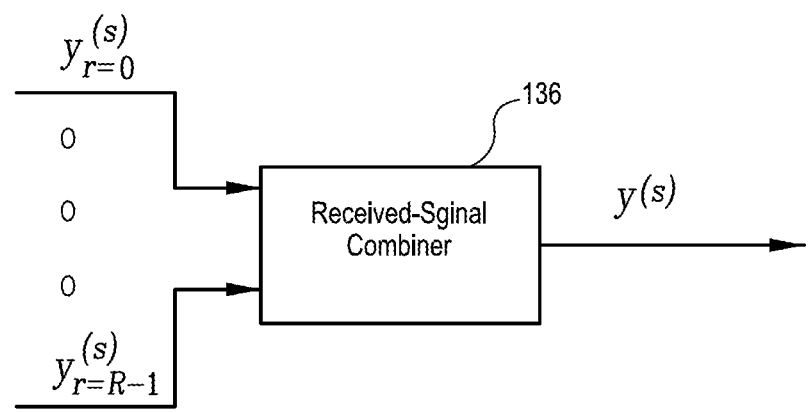
FIG. 16 is a block diagram of an embodiment of the received-signal combiner of FIG. 13.

FIG. 16 is a diagram of an embodiment of a received-signal combiner 136 of the receiver 130 of FIG. 13. The combiner 130 generates the RN×1 received-signal vector $y^{(s)}$ from the R N×1 partial received-signal column vectors $y_r^{(s)}$ (0≤r≤R−1) according to the following equation:

$$y^{(s)} = [y_{r=0}^{(s)T} y_{r=1}^{(s)T} \dots y_{r=R-1}^{(s)T}]^T \quad (52)$$

such that one may think of $y^{(s)}$ as a vector that includes 1 column of R N×1 vectors.

Figure 17:
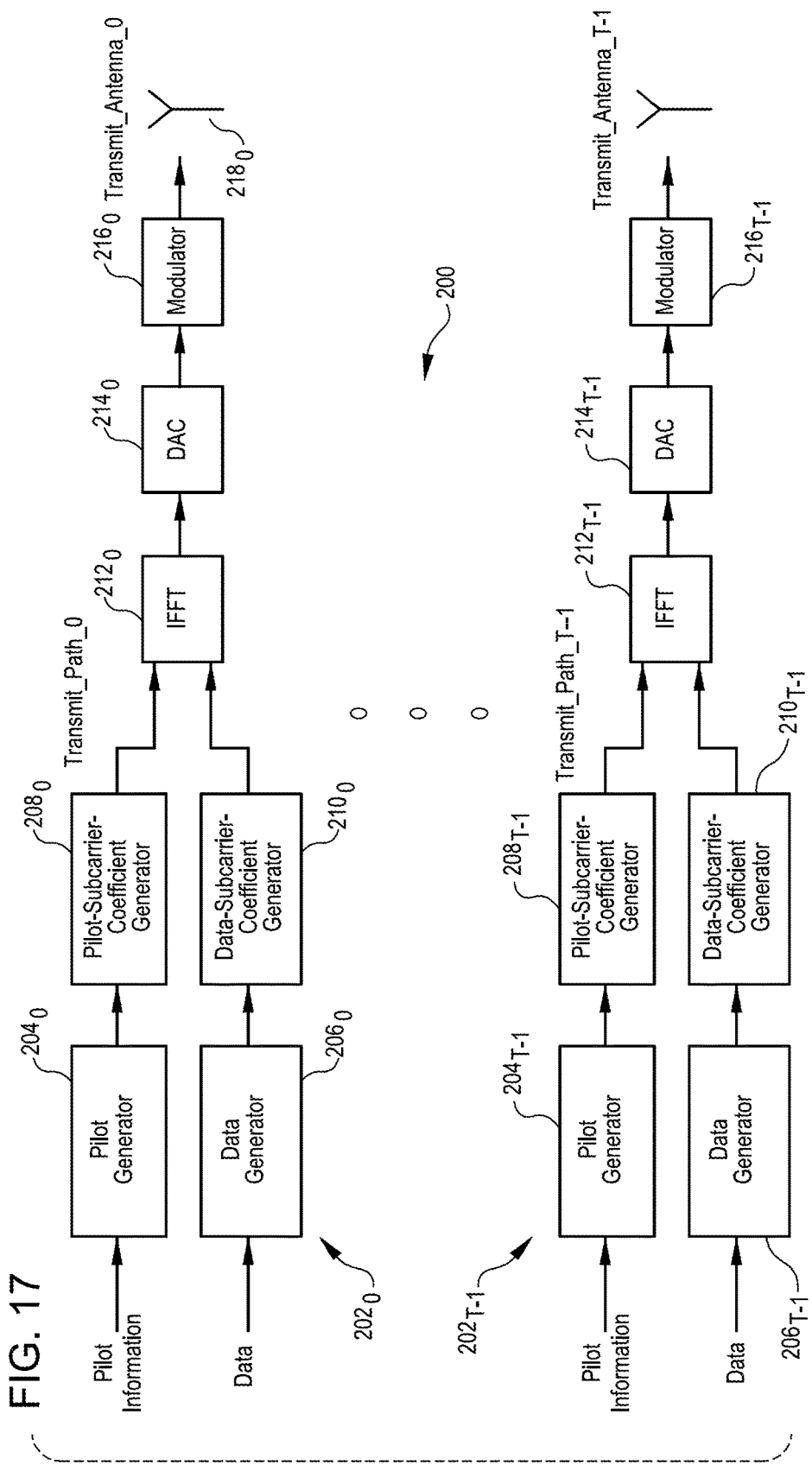
FIG. 17 is a block diagram of an embodiment of a transmitter of one or both of the base and client transmitter-receivers of FIGS. 11 and 12.

FIG. 17 is a diagram of an embodiment of a MIMO-OFDM transmitter 200, which may generate a pilot-symbol pattern $p_{pat}^{(i)}$ (for 0≤i≤T−1) that is compatible with a receiver such as the receiver 130 of FIG. 13.

The transmitter 200 includes T transmit paths $202_0$-$202_{T-1}$. For brevity, only the path $202_0$ is described in detail, it being understood that the remaining paths $202_1$-$202_{T-1}$ may be similar.

The transmit path $202_0$ includes a pilot generator $204_0$, a data generator $206_0$, a pilot-subcarrier-coefficient generator $208_0$, a data-subcarrier-coefficient generator $210_0$, an Inverse Fourier Transform (IFFT) unit $212_O$, a digital-to-analog converter (DAC) $214_O$, a modulator $216_O$, and an antenna $218_O$.

The pilot generator $204_O$ generates pilot subsymbols from pilot information that may include a pilot pattern in the form of a pilot-pattern matrix $p_{pat}^{(i)}$, which is discussed further below.

Similarly, the data generator $206_O$ generates data subsymbols from data information.

The pilot-subcarrier-coefficient generator $208_O$ generates from each pilot subsymbol a respective complex frequency-domain coefficient for mapping to the respective pilot subcarrier.

Similarly, the data-subcarrier-coefficient generator $210_O$ generates from each data subsymbol a respective complex frequency-domain coefficient for mapping to the respective data subcarrier.

The IFFT unit $212_O$ transforms the pilot-subcarrier and data-subcarrier coefficients into a digital time-domain waveform.

The DAC $214_O$ converts the digital time-domain waveform into an analog time-domain waveform.

The modulator $216_O$ modulates a carrier signal (e.g., a 5.4 GHz carrier) with the analog waveform.

And the antenna $218_O$ transmits the modulated carrier signal for reception by a receiver such as the receiver 130 of FIG. 13. The antenna $218_O$ may also function as a receive antenna if the transmitter 200 is part of a transmitter/receiver device.

In an embodiment, the pilot generators 204 may each generate a respective pilot pattern according to a respective pilot-pattern matrix $p_{pat}^{(i)}$ such that each column of $p_{pat}^{(i)}$ generated by one of the pilot generators is orthogonal to every column of all the other pilot-pattern matrices $p_{pat}^{(i)}$ generated by the other pilot generators. Such orthogonality is present when the following equation is true:

$$p_{pat}^{(m)} p_{pat}^{(n)H} = 0 \text{ for } 0 \le m \le T-1, 0 \le n \le T-1, \text{ and } m \ne n \tag{53}$$

An example of such orthogonal pilot-pattern matrices is given by the following equation:

$$p_{pat}^{(i)} = [f^{(iZ)}; f^{(iZ)}; \ldots; f^{(iZ)}] \text{ for } 0 \le i \le T-1 \tag{54}$$

where i is the transmit-antenna index, Z is the number of paths L in each channel (in an embodiment it is assumed that each channel always has the same number Z of paths L), and $p_{pat}^{(i)}$ has $N_p$ rows (each row represents a pilot cluster) and $L_{PN} = 2w_p + 1$ identical columns (i.e. $f^{(iZ)} f^{(iZ)H} = 1$).

An example of the $N_p \times 1$ column vector $f^{(iZ)}$ is given by the following equation:

$$f^{(iZ)} = [1 \ e^{-j2\pi \Delta f_p iZ} \ e^{-j2\pi 2\Delta f_p iZ} \ e^{-j2\pi 3\Delta f_p iZ} \ \ldots \ e^{-j2\pi(N_p-1)\Delta f_p iZ}]^T \tag{55}$$

where $$\Delta f_p = \frac{1}{N_p}.$$

It has been found that such orthogonal pilot-pattern matrices $p_{pat}^{(i)}$ allow a MIMO-OFDM channel estimator, such as the channel estimator 138 of FIG. 13, to avoid performing a matrix inversion (at least in real time) by including, e.g., recursive filters such as the VSSO Kalman filter substages 160 of FIG. 14.

In another embodiment, the pilot generators 204 may each generate a respective pilot pattern according to a respective pilot-pattern matrix $p_{pat}^{(i)}$ such that not only is each column of $p_{pat}^{(i)}$ generated by one of the pilot generators orthogonal to every column of the pilot-pattern matrices $p_{pat}^{(i)}$ generated by the other pilot generators, but each column of $p_{pat}^{(i)}$ is also orthogonal to every other column of the same matrix $p_{pat}^{(i)}$. Such "dual" orthogonality is present when the following equations are true:

$$p_{pat}^{(m)} p_{pat}^{(n)H} = 0 \text{ for } 0 \le m \le T-1, 0 \le n \le T-1, \text{ and } m \ne n \tag{53}$$

$$f_{pat}^{(d)} f_{pat}^{(v)H} = 0 \text{ for } 0 \le d \le L_{PN}-1, 0 \le v \le L_{PN}-1, \text{ and } d \ne v \tag{54}$$

where $f_{pat}^{(i,u)}$ are the $L_{PN}$ column vectors that compose $p_{pat}^{(i)}$.

An example of such pilot-pattern matrices with dual orthogonality is given by the following equation:

$$p_{pat}^{(i)} = [f^{(iL_p Z + 0Z)}; f^{(iL_p Z + 1Z)}; f^{(iL_p Z + 2Z)}; \ldots; f^{(iL_p Z + (L_p-1)Z)}] \text{ for } 0 \le i \le T-1 \tag{55}$$

where i is the transmit-antenna index, Z is the number of paths L in each channel (in an embodiment it is assumed that each channel always has the same number Z of paths L), and $p_{pat}^{(i)}$ has $N_p$ rows (each row represents a pilot cluster) and $L_{PN} = 2w_p + 1$ orthogonal columns such that $f^{(iL_p Z + d)} f^{(iL_p Z + v)H} = 0$ for $0 \le d \le (L_{PN}-1)Z, 0 \le v \le (L_{PN}-1)Z$, and $d \ne v$.

An example of the $N_p \times 1$ column vectors $f^{(iL_p Z + u)}$ for $0 \le u \le (L_p-1)Z$ is given by the following equation:

$$f^{(iL_p Z + u)} = [1 \ e^{-j2\pi \Delta f_p (iL_p Z + u)} \ e^{-j2\pi 2\Delta f_p (iL_p Z + u)} \ e^{-j2\pi 3\Delta f_p (iL_p Z + u)} \ \ldots \ e^{-j2\pi(N_p-1)\Delta f_p (iL_p Z + u)}]^T \tag{56}$$

where $$\Delta f_p = \frac{1}{N_p}.$$

It has been found that such dual-orthogonal pilot-pattern matrices $p_{pat}^{(i)}$, such as those generated per equation (55), may improve the performance of a MIMO-OFDM channel estimator that does not include recursive filters such as the VSSO Kalman filter substages 160 of FIG. 14. Furthermore, such dual-orthogonal pilot-pattern matrices $p_{pat}^{(i)}$ may also be usable with a MIMO-OFDM channel estimator, such as the channel estimator 138 of FIG. 13, that includes recursive filters such as the VSSO Kalman filter substages 160 of FIG. 14.

A more general algorithm for designing dual-orthogonal pilot-pattern matrices $p_{pat}^{(i)}$, such pilot-pattern matrices including, but not limited to, the pilot-pattern matrices $p_{pat}^{(i)}$ of equation (55), is described according to an embodiment.

Let $S^{(i)}$ denotes a set or vector corresponding to the $i^{th}$ transmit antenna $T_i$, where $N_T$ is the total number of transmit antennas T in a MIMO-OFDM system and $0 \le i \le N_T - 1$. The values of the elements of $S^{(i)}$ are integers between 0 and $N_P - 1$ inclusive, and the difference between any two elements of $S^{(i)}$ is greater than or equal to L. Furthermore, the number of elements in $S^{(i)}$ is $N^{(i)}$, where $0 < N(i) \le (N_p/L) - 1$. Note that the number $N^{(i)}$ need not be the same for each value of i; that is, the number of elements in $S^{(i)}$ may be different for different values of i, and, therefore, may be different for different transmit antennas Ti. Moreover, L is (or, at least for purposes of an embodiment of the described algorithm, is assumed to be) the same for each channel between each transmit antenna $T_i$ and each receive antenna $R_r$, where r is the number of receive antennas in the MIMO-OFDM system minus one, and may equal, but need not equal, i, for example, r≥i−1>0.

Next, the $N_T$ sets $S^{(0)}, \ldots, S^{(N_T-1)}$ are populated such that the difference between any element of a set $S^{(i)}$ and any element of another set $S^{(j)}$ is greater than or equal to L, where i≠j, 0≤i≤$N_T$−1, and 0≤j≤$N_T$−1. For example, if there are $N_p$=32 pilot clusters in a symbol transmitted from the $i^{th}$ transmit antenna $T_i$, and L=3 paths between each transmit antenna $T_i$ and each receive antenna $R_r$, then $S^{(i)}$ can have from 1 to ($N_p$=32)/(L=3)≈10 elements, each element having a value that can be selected from a range 0 to 31 inclusive. For example, where $N_T$=3, $N^{(0)}$=2, $N^{(1)}$=3, and $N^{(2)}$=4, $S^0$ can equal [0, 3], $S^{(1)}$ can equal [6, 9, 12], and $S^{(2)}$ can equal [15, 18, 21, 24].

Then, let $\Psi_A^{(i)}$ be an $L_p \times N^{(i)}$ matrix associated with the $i^{th}$ transmit antenna $T_i$.

Next, assuming that the normalized average power of each pilot/data symbol to be transmitted, or being transmitted, by each transmit antenna T, is, or can be approximated as, unity, generate $\Psi_A^{(i)}$ such that the following equation is true:

$$\Sigma_{m=0}^{L_p-1}(\Sigma_{p=0}^{N^{(i)}-1}|\Psi_A^{(i)}(m,p)|^2)=L_p \quad (57)$$

where "||" indicates the modulus or magnitude of the complex number $\Psi_A^{(i)}$ (m, p), which is the value of the matrix element located in the $m^{th}$ row and $p^{th}$ column of the matrix $\Psi_A^{(i)}$.

Then, let $\Psi_B^{(i)}$ be another $L_p \times N^{(i)}$ matrix associated with the $i^{th}$ transmit antenna $T_i$, where the respective value of each element of $\Psi_B^{(i)}$ is an integer that is between 0 and $N_p$−1 inclusive; there are no other constraints placed on $\Psi_B^{(i)}$ or on the values of its elements. For example, more than one element of $\Psi_B^{(i)}$ may have the same value.

Next, the $m^{th}$ column of the pilot-pattern matrix $P_{pat}^{(i)}$ for the $i^{th}$ transmit antenna $T_i$ is given by the following equation:

$$P_{pat}^{(i)}(:,m)=\Sigma_{p=0}^{N^{(i)}}(\Psi_A^{(i)}(m,p) \cdot f^{(S^{(i)}(p),\Psi_B^{(i)}(m,p))}), \\ 0 \leq m \leq L_p-1 \quad (58)$$

where $S^{(i)}(p)$ is the $p^{th}$ element of $S^{(i)}$, $f^{(S^{(i)}(p))}$ is given by the following equation $$f^{(S^{(i)}(p))}=[1 e^{-j2\pi\Delta f_p(S^{(i)}(p))} e^{-j2\pi 2\Delta f_p(S^{(i)}(p))} \\ e^{-j2\pi 3\Delta f_p(S^{(i)}(p))} \ldots e^{-j2\pi(N_p-1)\Delta f_p(S^{(i)}(p))}]^T \quad (59)$$

(this equation is modified appropriately if $N_p$−1 is less than two), and $f^{(S^{(i)}(p),\Psi_B^{(i)}(m,p))}$ denotes the column vector generated by circularly shifting the elements of the column vector $f^{(S^{(i)}(p))}$ of equation (59) downward a number of times equal to the value $\Psi_B^{(i)}(m,p)$, which is the element in the $m^{th}$ row and the $p^{th}$ column of the matrix $\Psi_B^{(i)}$.

Therefore, the entire pilot-pattern matrix $P_{pat}^{(i)}$ can be generated by constructing each column m of the matrix according to equation (58). For example, each of the pilot generators 204 of FIG. 17 can generate a respective pilot-pattern matrix $P_{pat}^{(i)}$ according to equation (58). Each pilot-pattern matrix $P_{pat}^{(i)}$ generated according to equation (58) has the same dimensions, $N_p \times L_p$, where, as described above, $N_p$ is the number of pilot clusters in a transmitted symbol, and $L_p$ is the number of pilot subsymbols (pilot tones) in each pilot cluster. Furthermore, for a MIMO-OFDM system, the subcarrier positions of the pilot clusters are the same for each pilot-pattern matrix $P_{pat}^{(i)}$ generated according to equation (58), and, therefore, are the same for the symbols respectively transmitted by each of the i transmit antennas $T_i$ in the system.

Furthermore, the pilot-pattern matrices $P_{pat}^{(i)}$ generated per equation (58) have dual orthoganality like the pilot-pattern matrices generated per equation (55); in fact, the pilot-pattern matrices that can be generated per equation (55) are a subset of the pilot-pattern matrices that can be generated per equation (58).

It has been found that dual-orthogonal pilot-pattern matrices $p_{pat}^{(i)}$ generated per equation (58) may improve the performance of a MIMO-OFDM channel estimator that does not include recursive filters such as the VSSO Kalman filter substages 160 of FIG. 14. Furthermore, such dual-orthogonal pilot-pattern matrices $p_{pat}^{(i)}$ generated per equation (58) may also be usable with a MIMO-OFDM channel estimator, such as the channel estimator 138 of FIG. 13, that includes recursive filters such as the VSSO Kalman filter substages 160 of FIG. 14.

According to an embodiment, so that a channel estimator, such as the channel estimator 138 of FIG. 13, can better estimate a channel over which a MIMO-OFDM transmitter, such as the transmitter 200 of FIG. 17, transmits pilot-pattern matrices $P_{pat}^{(i)}$ generated per equation (58), a designer may modify the channel estimator to operate according to a modification of the matrices $q_l^{(i)H}$ of equation (37) as described below; although other changes to the procedure and equations described above in conjunction with FIGS. 13 and 14 are contemplated to fit a particular MIMO-OFDM application, no such other changes are described.

A unit-norm column vector $\epsilon^{(i)}$ is defined according to the following equation:

$$\epsilon^{(i)}=\Sigma_{p=0}^{N^{(i)}-1}a_p f^{(S^{(i)}(p),b_p)} \quad (60)$$

where $f^{(S^{(i)}(p),b_p)}$ denotes the column vector generated by circularly shifting the elements of the column vector $f^{(S^{(i)}(p))}$ of equation (59) downward a number of times equal to a value $b_p$, which is an integer between 0 and $N_p$−1 inclusive.

The unit norm condition is $\|\epsilon^{(i)}\|^2=1$, which yields the following relation:

$$\sum_{p=0}^{N^{(i)}-1} |a_p|^2 = \frac{1}{N_p} \quad (61)$$

where the "||" operator indicates the modulus, or magnitude, of the complex number $a_p$. For example, one solution for $a_p$ that satisfies equation (61) is given by the following equation:

$$a_p = \frac{1}{\sqrt{N^{(i)} \cdot N_p}} + 0j \quad (62)$$

for all values of p.

The matrix $q_l^{(i)H}$ of equation (37) may be modified according to the following equation:

$$q_l^{(i)H}=[\epsilon^{(i)H} \ldots \epsilon^{(i)H}] \quad (63)$$

where the column vector $\epsilon^{(i)H}$ is repeated $2B_p+1$ times in the matrix $q_l^{(i)H}$−$B_p$ has no particular relation to $b_p$ of equation (60), and, as described above, $B_p$ is the number of interior pilot subcarriers to the left and to the right of the center pilot subcarrier in a pilot cluster. Therefore, the matrix $q_l^{(i)H}$ of equation (63) includes $2B_p+1$ identical columns, where each column is equal to the column vector $\epsilon_{(i)H}$. Furthermore, the matrices $q_l^{(i)H}$ of equation (37) are a subset of the matrices $q_l^{(i)H}$ of equation (63).

Still referring to FIG. 17, alternate embodiments of the transmitter 200 are contemplated. For example, the modulators 216 may be omitted. Furthermore, the functions performed any of the components of the transmitter 200 may be performed in hardware, software, or a combination of hardware and software, where the software is executed by a controller such as a processor. Moreover, pilot patterns and pilot-pattern matrices other than those described are contemplated.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the components described above may be disposed on a single or multiple IC dies to form one or more ICs, these one or more ICs may be coupled to one or more other ICs to form a device such as a transceiver, and one or more of such devices may be coupled or otherwise used together to form a system.

The invention claimed is:

1. An electronic device comprising:
a plurality of transmit paths each comprising:
a pilot generator configured to receive pilot information and generate pilot sub-symbols based upon the pilot information, the pilot sub-symbols being in a form of a pilot pattern matrix having a dual orthogonality such that each column of the pilot pattern matrix is orthogonal to each column of a pilot pattern matrix generated by pilot generators in each other transmit path, and each column of the pilot pattern matrix is orthogonal to each other column of the pilot pattern matrix in a given one of the plurality of transmit paths, each $m^{th}$ column of the pilot pattern matrix $P_{pat}^{(i)}$ for the $i^{th}$ transmit path $T_i$ being constructed according to an equation:

$$P_{pat}^{(i)}(:,m) = \sum_{p=0}^{N^{(i)}} \left( \Psi_A^{(i)}(m,p) \cdot f^{(s^{(i)}(p), \Psi_B^{(i)}(m,p))} \right)$$

where $0 \le m \le L_p-1$, $L_p$ is the number of pilot sub-symbols, $0 \le i \le N_T-1$ where $N_T$ is the total number of transmit paths, $\Psi_A^{(i)}$ is an $L_p \times N^{(i)}$ matrix associated with the $i^{th}$ transmit path $T_i$, $\Psi_A^{(i)}(m,p)$ is the value of the matrix element located in the $m^{th}$ row and $p^{th}$ column of the matrix $\Psi_A^{(i)}$, $S^{(i)}(p)$ is the $p^{th}$ element of $S^{(i)}$ where $S^{(i)}$ denotes a set or vector corresponding to the $i^{th}$ transmit path $T_i$, and where $f^{(S^{(i)}(p))}$ is given by an equation:

$$f^{(S^{(i)}(p))} = [1\ e^{-j2\pi \Delta f_p(S^{(i)}(p))}\ e^{-j2\pi 2\Delta f_p(S^{(i)}(p))}\ e^{-j2\pi 3\Delta f_p(S^{(i)}(p))} \ldots e^{-j2\pi(N_p-1)\Delta f_p(S^{(i)}(p))}]^T$$

where $f^{(S^{(i)}(p), \Psi_B^{(i)}(m,p))}$ denotes the column vector generated by circularly shifting the elements of the column vector $f^{(S^{(i)}(p))}$ downward a number of times equal to the value (m,p), which is the element in the $m^{th}$ row and the $p^{th}$ column of the matrix $\Psi_B^{(i)}$ that is another $L_p \times N^{(i)}$ matrix associated with the $i^{th}$ transmit antenna $T_i$, where the respective value of each element of $\Psi_B^{(i)}$ is an integer that is between 0 and $N_p-1$ inclusive, where $0 < N(i) \le (N_p/L)-1$ where $N_p$ is a minimum number of pilot clusters $L_p$ and $L$ is the number of transmission paths;

a pilot-subcarrier-coefficient generator coupled to said pilot generator and configured to generate from each pilot sub-symbol a respective complex frequency-domain coefficient for mapping to a respective pilot subcarrier;

a data generator configured to receive data information and generate data sub-symbols; and a data-subcarrier-coefficient generator coupled to said data generator and configured to generate, from each data symbol, a respective complex frequency domain coefficient for mapping to a respective data subcarrier.

2. The electronic device of claim 1, wherein each of said plurality of transmit paths further comprises an inverse Fourier transform (IFT) circuit coupled to said pilot-subcarrier-coefficient generator and said data-subcarrier-coefficient generator and configured to transform the pilot subcarrier coefficients and data subcarrier coefficients into a digital time-domain waveform.

3. The electronic device of claim 2, wherein each of said plurality of transmit paths further comprises a digital-to-analog converter (DAC) coupled to said (IFT) circuit and configured to convert the digital time-domain waveform into an analog time-domain waveform.

4. The electronic device of claim 3, wherein each of said plurality of transmit paths further comprises a modulator coupled to said DAC and configured to modulate a carrier signal with the analog time-domain waveform.

5. The electronic device of claim 4, wherein each of said plurality of transmit paths further comprises an antenna coupled to said modulator.

6. The electronic device of claim 1, wherein said plurality of transmit paths are for a given communication channel; and wherein said electronic device further comprises a further plurality of transmit paths corresponding to a further communications channel.

7. The electronic device of claim 6, wherein a number of said plurality of transmit paths for the given communications channel is equal to a number of said further plurality of transmit paths for the further communications channel.

8. A system comprising:
a transmitter configured to transmit a modulated carrier signal;
a plurality of transmit paths each comprising:
a pilot generator configured to receive pilot information and generate pilot sub-symbols based upon the pilot information, the pilot sub-symbols being in a form of a pilot pattern matrix having a dual orthogonality such that each column of the pilot pattern matrix is orthogonal to each column of a pilot pattern matrix generated by pilot generators in each other transmit path, and each column of the pilot pattern matrix is orthogonal to each other column of the pilot pattern matrix in a given one of the plurality of transmit paths, each $m^{th}$ column of the pilot pattern matrix $P_{pat}^{(i)}$ for the $i^{th}$ transmit path $T_i$ being constructed according to an equation:

$$P_{pat}^{(i)}(:,m) = \sum_{p=0}^{N^{(i)}} \left( \Psi_A^{(i)}(m,p) \cdot f^{(s^{(i)}(p), \Psi_B^{(i)}(m,p))} \right)$$

where $0 \le m \le L_p-1$, $L_p$ is the number of pilot sub-symbols, $0 \le i \le N_T-1$ where $N_T$ is the total number of transmit paths, $\Psi_A^{(i)}$ is an $L_p \times N^{(i)}$ matrix associated with the $i^{th}$ transmit path $T_i$, $\Psi_A^{(i)}(m,p)$ is the value of the matrix element located in the $m^{th}$ row and $p^{th}$ column of the matrix $\Psi_A^{(i)}$, $S^{(i)}(p)$ is the $p^{th}$ element of $S^{(i)}$ where $S^{(i)}$ denotes a set or vector corresponding to the $i^{th}$ transmit path $T_i$, and where $f^{(S^{(i)}(p))}$ is given by an equation:

$$f^{(S^{(i)}(p))} = [1 e^{-j2\pi\Delta f_p(S^{(i)}(p))} e^{-j2\pi 2\Delta f_p(S^{(i)}(p))} e^{-j2\pi 3\Delta f_p(S^{(i)}(p))} \ldots e^{-j2\pi(N_p-1)\Delta f_p(S^{(i)}(p))}]^T$$

where $f^{(S^{(i)}(p),\Psi_B^{(i)}(m,p))}$ denotes the column vector generated by circularly shifting the elements of the column vector $f^{(S^{(i)}(p))}$ downward a number of times equal to the value $\Psi_B^{(i)}(m,p)$, which is the element in the $m^{th}$ row and the $p^{th}$ column of the matrix $\Psi_B^{(i)}$ that is another $L_p \times N^{(i)}$ matrix associated with the $i^{th}$ transmit antenna $T_i$, where the respective value of each element of $\Psi_B^{(i)}$ is an integer that is between 0 and $N_p-1$ inclusive, where $0 < N(i) \leq (N_p/L)-1$ where $N_p$ is a minimum number of pilot clusters $L_p$ and L is the number of transmission paths;

a pilot-subcarrier-coefficient generator coupled to said pilot generator and configured to generate from each pilot sub-symbol a respective complex frequency-domain coefficient for mapping to a respective pilot subcarrier;

a data generator configured to receive data information and generate data sub-symbols; and a data-subcarrier-coefficient generator coupled to said data generator and configured to generate, from each data symbol, a respective complex frequency domain coefficient for mapping to a respective data subcarrier; and a receiver operatively coupled to said transmitter and configured to receive the modulated carrier signal.

9. The system of claim 8, wherein each of said plurality of transmit paths further comprises an inverse Fourier transform (IFT) circuit coupled to said pilot-subcarrier-coefficient generator and said data-subcarrier-coefficient generator and configured to transform the pilot subcarrier coefficients and data subcarrier coefficients into a digital time-domain waveform.

10. The system of claim 9, wherein each of said plurality of transmit paths further comprises a digital-to-analog converter (DAC) coupled to said IFT circuit and configured to convert the digital time-domain waveform into an analog time-domain waveform.

11. The system of claim 10, wherein each of said plurality of transmit paths further comprises a modulator coupled to said DAC and configured to modulate a carrier signal with the analog time-domain waveform.

12. The system of claim 11, wherein each of said plurality of transmit paths further comprises an antenna coupled to said modulator and configured to transmit the modulated carrier signal for reception by said receiver.

13. The system of claim 9, wherein said plurality of transmit paths are for a given communication channel; and wherein said system further comprises a further plurality of transmit paths corresponding to a further communications channel.

14. The system of claim 13, wherein a number of said plurality of transmit paths for the given communications channel is equal to a number of said further plurality of transmit paths for the further communications channel.

15. A method of communicating over a plurality of transmit paths, the method comprising for each of the plurality of transmit paths:

using a pilot generator to receive pilot information and generate pilot sub-symbols based upon the pilot information, the pilot sub-symbols being in a form of a pilot pattern matrix having a dual orthogonality such that each column of the pilot pattern matrix is orthogonal to each column of a pilot pattern matrix generated by pilot generators in each other transmit path, and each column of the pilot pattern matrix is orthogonal to each other column of the pilot pattern matrix in a given one of the plurality of transmit paths, wherein each $m^{th}$ column of the pilot pattern matrix $P_{pat}^{(i)}$ for the $i^{th}$ transmit path $T_i$ being constructed according to an equation:

$$P_{pat}^{(i)}(:,m) = \sum_{p=0}^{N^{(i)}} \left( \Psi_A^{(i)}(m,p) \cdot f^{(s^{(i)}(p),\Psi_B^{(i)}(m,p))} \right)$$

where $0 \leq m \leq Lp-1$, Lp is the number of pilot sub-symbols, $0 \leq i \leq N_T-1$ where $N_T$ is the total number of transmit paths, $\Psi_A^{(i)}$ is an $L_p \times N^{(i)}$ matrix associated with the $i^{th}$ transmit path $T_i$, $\Psi_A^{(i)}(m,p)$ is the value of the matrix element located in the $m^{th}$ row and $p^{th}$ column of the matrix $\Psi_A^{(i)}$, $S^{(i)}(p)$ is the $p^{th}$ element of $S^{(i)}$ where $S^{(i)}$ denotes a set or vector corresponding to the $i^{th}$ transmit path $T_i$, and where $f^{(S^{(i)}(p))}$ is given by an equation:

$$f^{(S^{(i)}(p))} = [1 e^{-j2\pi\Delta f_p(S^{(i)}(p))} e^{-j2\pi 2\Delta f_p(S^{(i)}(p))} e^{-j2\pi 3\Delta f_p(S^{(i)}(p))} \ldots e^{-j2\pi(N_p-1)\Delta f_p(S^{(i)}(p))}]^T$$

where $f^{(S^{(i)}(p),\Psi_B^{(i)}(m,p))}$ denotes the column vector generated by circularly shifting the elements of the column vector $f^{(S^{(i)}(p))}$ downward a number of times equal to the value $\Psi_B^{(i)}(m, p)$, which is the element in the $m^{th}$ row and the $p^{th}$ column of the matrix $\Psi_B^{(i)}$ that is another $L_p \times N^{(i)}$ matrix associated with the $i^{th}$ transmit antenna $T_i$, where the respective value of each element of $\Psi_B^{(i)}$ is an integer that is between 0 and $N_p-1$ inclusive, where $0 < N(i) \leq (N_p/L)-1$ where $N_p$ is a minimum number of pilot clusters $L_p$ and L is the number of transmission paths;

using a pilot-subcarrier-coefficient generator coupled to the pilot generator to generate from each pilot sub-symbol a respective complex frequency-domain coefficient for mapping to a respective pilot subcarrier;

using a data generator to receive data information and generate data sub-symbols; and using a data-subcarrier-coefficient generator coupled to the data generator to generate, from each data symbol, a respective complex frequency domain coefficient for mapping to a respective data subcarrier.

16. A non-transitory computer readable medium for an electronic device comprising a plurality of transmit paths, the non-transitory computer readable medium comprising computer-executable instructions to cause the electronic device to perform operations comprising, for each of the plurality of transmit paths:

generating pilot sub-symbols based upon received pilot information, the pilot sub-symbols being in a form of a pilot pattern matrix having a dual orthogonality such that each column of the pilot pattern matrix is orthogonal to each column of a pilot pattern matrix generated by pilot generators in each other transmit path, and each column of the pilot pattern matrix is orthogonal to each other column of the pilot pattern matrix in a given one of the plurality of transmit paths, each $m^{th}$ column of the pilot pattern matrix $P_{pat}^{(i)}$ for the $i^{th}$ transmit path $T_i$ being constructed according to an equation:

$$P_{pat}^{(i)}(:,m) = \sum_{p=0}^{N^{(i)}} \left( \Psi_A^{(i)}(m,p) \cdot f^{(s^{(i)}(p),\Psi_B^{(i)}(m,p))} \right)$$

where $0 \leq m \leq Lp-1$, Lp is the number of pilot sub-symbols, $0 \leq i \leq N_T-1$ where $N_T$ is the total number of transmit paths, $\Psi_A^{(i)}$ is an $L_p \times N^{(i)}$ matrix associated with the $i^{th}$ transmit path $T_i$, $\Psi_A^{(i)}(m,p)$ is the value of the matrix element located in the $m^{th}$ row and $p^{th}$ column of the matrix $\Psi_A^{(i)}$, $S^{(i)}$ (p) is the $p^{th}$ element of $S^{(i)}$ where $S^{(i)}$ denotes a set or vector corresponding to the $i^{th}$ transmit path $T_i$, and where $f^{(S^{(i)}(p))}$ is given by an equation:

$$f^{(S^{(i)}(p))} = [1\, e^{-j2\pi\Delta f_p(S^{(i)}(p))}\, e^{-j2\pi 2\Delta f_p(S^{(i)}(p))}\, e^{-j2\pi 3\Delta f_p(S^{(i)}(p))} \ldots e^{-j2\pi(N_p-1)\Delta f_p(S^{(i)}(p))}]^T$$

where $f^{(S^{(i)}(p),\Psi_B^{(i)}(m,p))}$ denotes the column vector generated by circularly shifting the elements of the column vector $f^{(S^{(i)}(p))}$ downward a number of times equal to the value $\Psi_B^{(i)}(m,p)$, which is the element in the $m^{th}$ row and the $p^{th}$ column of the matrix $\Psi_B^{(i)}$ that is another $L_p \times N^{(i)}$ matrix associated with the $i^{th}$ transmit antenna $T_i$, where the respective value of each element of $\Psi_B^{(i)}$ is an integer that is between 0 and $N_p-1$ inclusive, where $0 < N(i) \leq (N_p/L)-1$ where $N_p$ is a minimum number of pilot clusters $L_p$ and $L$ is the number of transmission paths;

generating from each pilot sub-symbol a respective complex frequency-domain coefficient for mapping to a respective pilot subcarrier;

generating data sub-symbols; and generating, from each data symbol, a respective complex frequency domain coefficient for mapping to a respective data subcarrier.

* * * * *

UNITED STATES PATENT AND TRADEMARK OFFICE
CERTIFICATE OF CORRECTION

PATENT NO. : 9,596,106 B2
APPLICATION NO. : 14/170111
DATED : March 14, 2017
INVENTOR(S) : Karthik Muralidhar et al.

Page 1 of 2

It is certified that error appears in the above-identified patent and that said Letters Patent is hereby corrected as shown below:

On the Title Page

Item (56):
"M. R Raghavendra, S. Bhashyann, and K. Giridhar, "Exploiting Hopping Pilots for Parametric Channel Estimation in OFDM Systems", IEEE Signal Processing Letters, Vol. 12, No. 11, Nov. 2005, pp.737-740" should read, --M. R Raghavendra, S. Bhashyam, and K. Giridhar, "Exploiting Hopping Pilots for Parametric Channel Estimation in OFDM Systems", IEEE Signal Processing Letters, Vol. 12, No. 11, Nov. 2005, pp.737-740--.

Item (56):
"IEEE 802.22 WRAN WG Home Page, IEEE 802.22 Working Group on Wireless Regional Area Networks Enabling Rural Broadband Wireless Access Using Cognitive Radio Technology in TV Whitespaces, http://www.ieee802.org122/, pp.2." should read, --IEEE 802.22 WRAN WG Home Page, IEEE 802.22 Working Group on Wireless Regional Area Networks Enabling Rural Broadband Wireless Access Using Cognitive Radio Technology in TV Whitespaces, http://www.ieee802.org/22/,pp.2--.

In the Claims

Column 37, Line 52:
"corresponding to the $i^{th}$ transmit path $T_i$, and where $f^{(S^{(i)}(p))}$" should read, --corresponding to the $i^{th}$ transmit path $T_i$, and where $f^{(S^{(i)}(p))}$ --.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,596,106 B2

Column 37, Lines 58-59:

" $f^{(S^{(i)}(p))}$ downward a number of times equal to the value (m,p), which is the element in the $m^{th}$ row and the $p^{th}$ column" should read, -- $f^{(S^{(i)}(p))}$ downward a number of times equal to the value $\psi\frac{(i)}{B}(m,p)$, which is the element in the $m^{th}$ row and the $p^{th}$ column--.

Column 39, Line 2:

"corresponding to the the $i^{th}$ transmit path $T_i$, and where $f^{(S^{(i)}(p))}$" should read, --corresponding to the $i^{th}$ transmit path $T_i$, and where $f^{(S^{(i)}(p))}$ --.

Column 39, Lines 6-8:

"where $f^{(S^{(i)}(p)), \Psi_B^{(i)}(m,p)}$ denotes the column vector generated by circularly shifting the elements of the column vector $f^{(S^{(i)}(p))}$ downward a number of times equal to the value" should read, --where $f^{(S^{(i)}(p)), \Psi_B^{(i)}(m,p)}$ denotes the column vector generated by circularly shifting the elements of the column vector $f^{(S^{(i)}(p))}$ downward a number of times equal to the value--.

Column 40, Line 18:

"corresponding to the $i^{th}$ transmit path $T_i$, and where $f^{(S^{(i)}(p))}$" should read, --corresponding to the $i^{th}$ transmit path $T_i$, and where $f^{(S^{(i)}(p))}$ --.

Column 40, Lines 22-24:

"where $f^{(S^{(i)}(p)), \Psi_B^{(i)}(m,p)}$ denotes the column vector generated by circularly shifting the elements of the column vector $f^{(S^{(i)}(p))}$ downward a number of times equal to the" should read, --where $f^{(S^{(i)}(p)), \Psi_B^{(i)}(m,p)}$ denotes the column vector generated by circularly shifting the elements of the column vector $f^{(S^{(i)}(p))}$ downward a number of times equal to the--.

Column 41, Line 3:

"corresponding to the $i^{th}$ transmit path $T_i$, and where $f^{(S^{(i)}(p))}$" should read, --corresponding to the $i^{th}$ transmit path $T_i$, and where $f^{(S^{(i)}(p))}$ --.

Column 41, Lines 7-9:

"where $f^{(S^{(i)}(p)), \Psi_B^{(i)}(m,p)}$ denotes the column vector generated by circularly shifting the elements of the column vector $f^{(S^{(i)}(p))}$ downward a number of times equal to the" should read, --where $f^{(S^{(i)}(p)), \Psi_B^{(i)}(m,p)}$ denotes the column vector generated by circularly shifting the elements of the column vector $f^{(S^{(i)}(p))}$ downward a number of times equal to the--.